(12) United States Patent
Uchimoto et al.

(10) Patent No.: US 7,724,751 B2
(45) Date of Patent: *May 25, 2010

(54) SYSTEM FOR SUPPORTING COMMUNICATIONS AMONG ATM DEVICES, DEVICE FOR SUPPORTING DATA TRANSMISSION, METHOD FOR SENDING DATA, AND COMPUTER PROGRAM PRODUCT

(75) Inventors: Norihisa Uchimoto, Kawasaki (JP); Koji Tatsumi, Kawasaki (JP); Kazuhisa Shimazaki, Kawasaki (JP); Koichiro Yamada, Kawasaki (JP); Satoshi Namura, Kawasaki (JP); Akio Morimoto, Kawasaki (JP); Michio Kusayanagi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1380 days.

This patent is subject to a terminal disclaimer.

(21) Appl. No.: 11/113,107

(22) Filed: Apr. 25, 2005

(65) Prior Publication Data
US 2006/0109849 A1 May 25, 2006

(30) Foreign Application Priority Data
Nov. 24, 2004 (JP) ............................. 2004-339650

(51) Int. Cl.
*H04L 12/56* (2006.01)
(52) U.S. Cl. ..................... 370/395.6; 370/401; 370/428

(58) Field of Classification Search ................. 370/466, 370/467, 395.52, 395.53, 401, 428, 395.6
See application file for complete search history.

(56) References Cited

U.S. PATENT DOCUMENTS
5,457,681 A * 10/1995 Gaddis et al. ............... 370/402
(Continued)

FOREIGN PATENT DOCUMENTS
JP 7-264207 10/1995
(Continued)

OTHER PUBLICATIONS
The ATM Forum, Frame-based ATM Transport over Ethernet, Feb. 2000.*
(Continued)

*Primary Examiner*—Salman Ahmed

(57) ABSTRACT

A first communication device receives an ATM cell bound for a second ATM device from a first ATM device via an ATM interface, and then the first communication device sends a data frame including the ATM cell to the second ATM device via wide area Ethernet. In addition, the first communication device sends a synchronization frame to the second ATM device via the wide area Ethernet continuously at a predetermined time interval in accordance with a clock frequency of the first ATM device. A second communication device receives the synchronization frame and measures a clock frequency of the first ATM device in accordance with a time interval of receiving the synchronization frame so as to reproduce a clock having the same frequency as the measured clock frequency. After that, the second communication device sends the clock to the second ATM device via an ATM interface.

18 Claims, 23 Drawing Sheets

U.S. PATENT DOCUMENTS

| | | | |
|---|---|---|---|
| 5,815,501 A * | 9/1998 | Gaddis et al. | 370/402 |
| 5,991,308 A * | 11/1999 | Fuhrmann et al. | 370/395.53 |
| 6,052,383 A * | 4/2000 | Stoner et al. | 370/466 |
| 6,072,810 A | 6/2000 | Van der Putten et al. | |
| 6,108,346 A * | 8/2000 | Doucette et al. | 370/450 |
| 6,327,273 B1 | 12/2001 | Van der Putten et al. | |
| 6,754,235 B2 | 6/2004 | Van Der Putten et al. | |
| 6,876,674 B1 * | 4/2005 | Ruutu et al. | 370/503 |
| 7,103,052 B2 * | 9/2006 | Shirasaki | 370/395.61 |
| 7,116,686 B2 | 10/2006 | Van Der Putten et al. | |
| 2004/0022234 A1 * | 2/2004 | Hagiwara | 370/352 |
| 2004/0062278 A1 * | 4/2004 | Hadzic et al. | 370/503 |

FOREIGN PATENT DOCUMENTS

| | | |
|---|---|---|
| JP | 10-233767 | 9/1998 |
| JP | 2005-64604 | 3/2005 |
| WO | WO 9847310 A1 * | 10/1998 |

OTHER PUBLICATIONS

Frame-based ATM Transport over Ethernet (FATE); AF-FBATM-0139.001; Jul. 2002.*

Carrying ATM Cells Over Ethernet; Arco et al. Milan, Italy; Sep. 8-Sep. 10; Euromicro 1999.*

Yuan et al. (Protocol and Implementation of ATM Over Ethernet); IEEE 2000.*

Roy C. Dixon (Cells-In-Frames: A System Overview); IEEE 1996.*

Japanese Offical Communication dated Jan. 12, 2010 for corresponding Japanese Patent application No. 2008-013270.

* cited by examiner

FIG. 6 (a)

| D-MAC | S-MAC | TYPE | INFO | USER-DATA | FCS |

FIG. 6 (b)

| D-MAC | S-MAC | LENGTH | LLC | SNAP | INFO | USER-DATA | FCS |

FIG. 6 (c)

| D-MAC | S-MAC | LENGTH | INFO | USER-DATA | FCS |

SYSTEM FOR SUPPORTING COMMUNICATIONS AMONG ATM DEVICES, DEVICE FOR SUPPORTING DATA TRANSMISSION, METHOD FOR SENDING DATA, AND COMPUTER PROGRAM PRODUCT

BACKGROUND OF THE INVENTION

1. Field of the Invention

The present invention relates to a system and a method for supporting communications among plural ATM devices.

2. Description of the Prior Art

FIG. 23 shows a conventional method for connecting ATM devices 5. A device such as an ATM terminal or an ATM exchange having an ATM (Asynchronous Transfer Mode) interface (hereinafter referred to as an "ATM device 5") performs communication with other ATM devices 5 via an ATM network as shown in FIG. 23. The ATM network enables a fast communication of multimedia data or the like. Therefore, a service for connecting ATM devices 5 to each other via the ATM network so as to establish a WAN (Wide Area Network) or the like is widespread.

However, a cost necessary for constructing and managing the ATM network is high, so a method for establishing a WAN at a lower cost is desired strongly.

On the other hand, as a method for establishing and operating a WAN, a method of connecting devices using a wide area Ethernet network has gained the spotlight. According to this method, a WAN can be established at a low cost.

Therefore, a method of replacing the existing ATM network for connecting ATM devices 5 with a wide area Ethernet network is possible. However, in such a method, it is difficult to predict a delay or a degree of dumping of frames in the wide area Ethernet network. Therefore, it is difficult to synchronize a clock of a lower order ATM device 5 with a clock of a higher order ATM device 5 of communication in the wide area Ethernet network. Accordingly, communication between ATM devices 5 cannot be performed well in the above-mentioned method.

As described in Japanese unexamined patent publication No. 7-264207, there is proposed a method of connecting a terminal device that is used in an Ethernet LAN (Local Area Network) environment to an ATM exchange simply. However, there is not proposed a method in which a wide area Ethernet network is used instead of the ATM network for communication between ATM devices 5.

SUMMARY OF THE INVENTION

An object of the present invention is to realize communications between ATM devices via a wide area Ethernet network.

A data transmission support device according to the present invention is a device for sending data from a first ATM device to a second ATM device by an ATM cell. The device includes a data frame reception portion for receiving a data frame that is an Ethernet frame including an ATM cell from another device via Ethernet, the other device being connected to the first ATM device, a control frame reception portion for receiving a control frame via the Ethernet, the control frame being sent by the other device at a predetermined time interval in accordance with a transmission side clock frequency that is a clock frequency for communication of the first ATM device, a clock reproducing portion for reproducing a clock having the same frequency as the transmission side clock frequency in accordance with the time interval of receiving the control frames, a clock transfer portion for transferring the reproduced clock to the second ATM device via an ATM interface, a conversion portion for converting the received data frame into an ATM cell, and an ATM cell transmission portion for sending the ATM cell converted by the conversion portion to the second ATM device via the ATM interface.

In the present invention, an "ATM device" means a device such as an ATM terminal or an ATM exchange having an ATM (Asynchronous Transfer Mode) interface.

According to the present invention, data transmission from one ATM device to another ATM device can be performed by using a wide area Ethernet instead of an ATM network.

BRIEF DESCRIPTION OF THE DRAWINGS

FIGS. 6(a)-6(c) show examples of formats of a synchronization frame and a data frame.

DESCRIPTION OF THE PREFERRED EMBODIMENTS

Hereinafter, the present invention will be explained more in detail with reference to embodiments and drawings.

Figure 1:
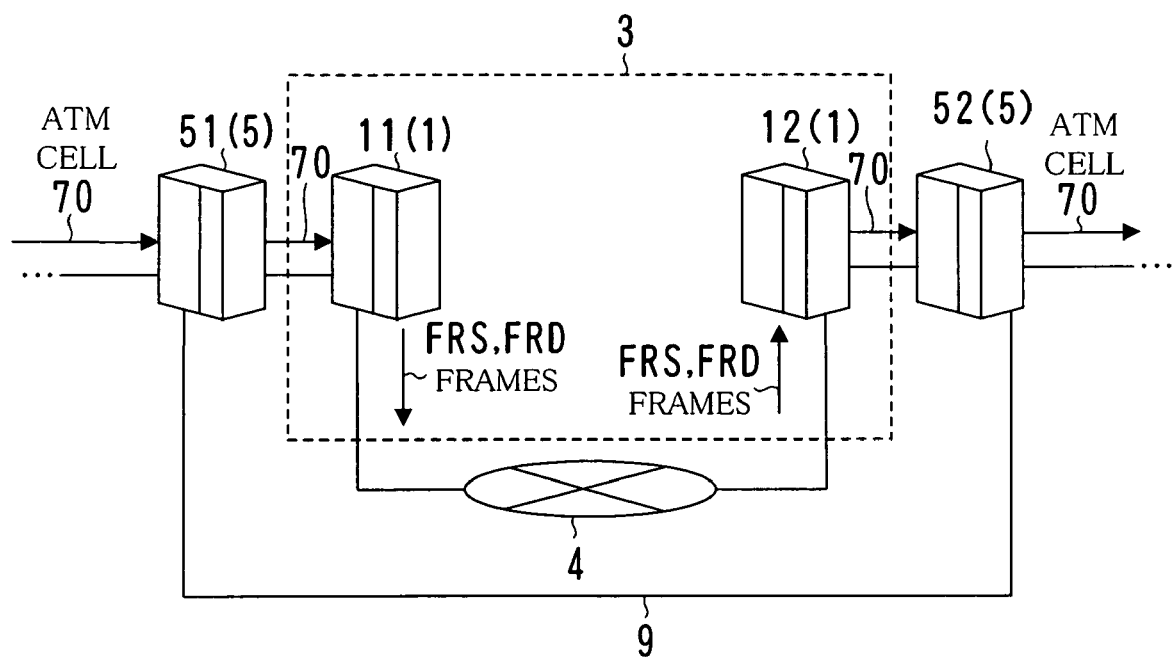
FIG. 1 shows an example of connecting two ATM devices by an ATM device connection system according to the present invention.
Figure 2:
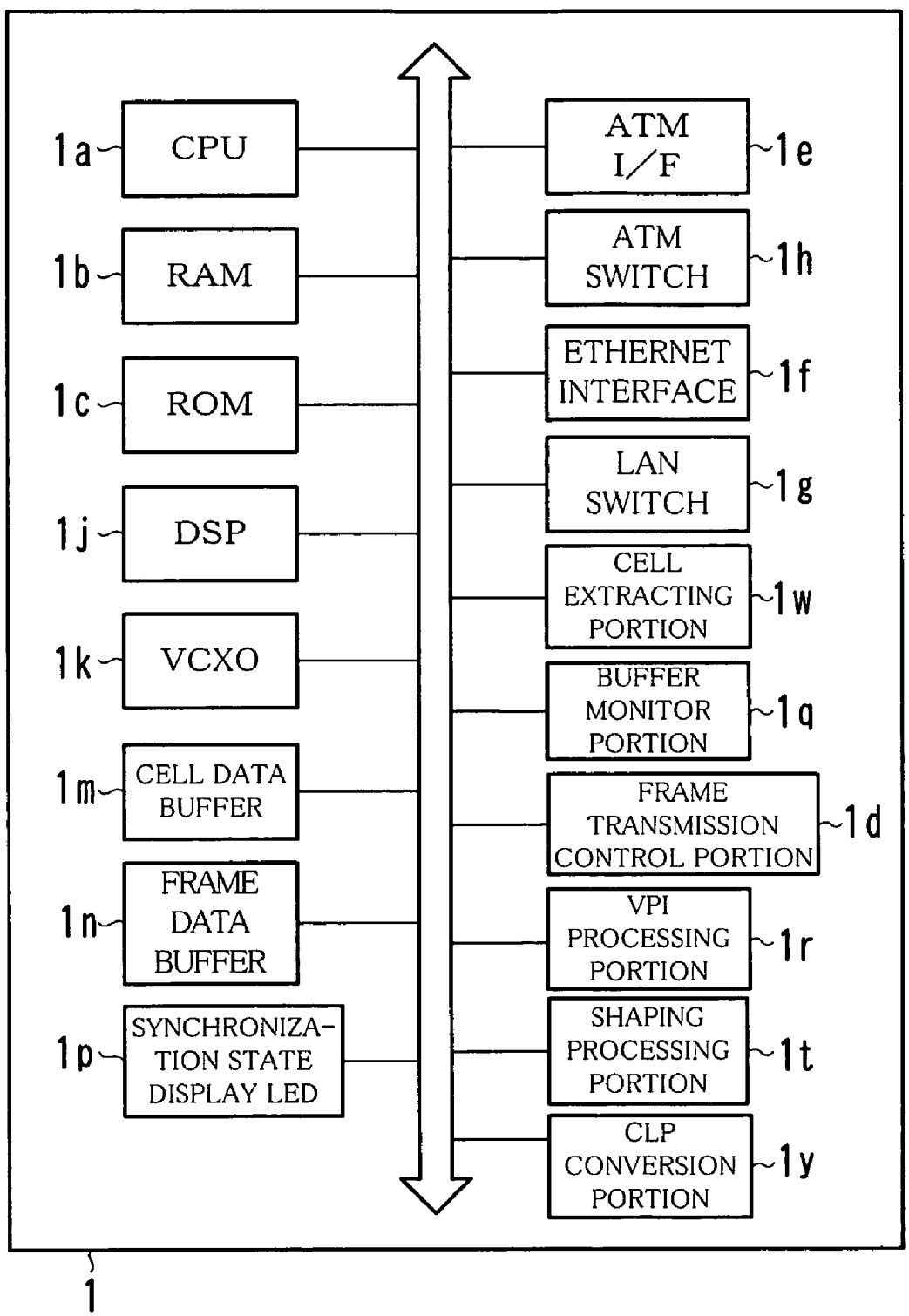
FIG. 2 shows an example of a structure of a communication device.

FIG. 1 shows an example of connecting two ATM devices 5 by an ATM device connection system 3 according to the present invention, and FIG. 2 shows an example of a structure of a communication device 1.

In FIG. 1, the ATM device 5 is a device such as an ATM terminal or an ATM exchange having an ATM interface. The ATM device 5 sends an ATM cell to other ATM device 5 or receives the ATM cell from other ATM device 5 via an ATM network 9, so as to perform data communication.

The ATM device connection system 3 according to the present invention includes two communication devices 1. The communication devices 1 are connected to each other via a wide area Ethernet 4 and perform data communication by sending and receiving frames. One of the communication devices 1 is connected to one of two ATM devices 5, while the other communication device 1 is connected to the other ATM device 5.

In addition, the communication device 1 has functions including a function for converting the ATM cell to an Ethernet frame (hereinafter referred to as a "frame" simply), a function for converting the Ethernet frame to the ATM cell, and a function for synchronizing a clock for data communication of one of the communication devices 1 with a clock for data communication of the other communication device 1. By these structures, the ATM device connection system 3 can perform data communication between two ATM devices 5 via the wide area Ethernet 4 instead of the conventional ATM network 9.

As the wide area Ethernet 4, Ethernet network such as Gigabit Ethernet or Fast Ethernet can be used. It is possible to use a general purpose wide area Ethernet network. A full-duplex communication can be performed in the wide area Ethernet 4.

The communication device 1 includes a CPU 1a, a RAM 1b, a ROM 1c, a frame transmission control portion 1d, an ATM interface 1e, an Ethernet interface 1f, a LAN switch 1g, an ATM switch 1h, a DSP (Digital Signal Processor) 1j, a VCXO (Voltage Controlled Xtal Oscillator) 1k, a cell data buffer 1m, a frame data buffer 1n, a synchronization state display LED (Light Emitting Diode) 1p, a buffer monitor portion 1q, a VPI processing portion 1r, a shaping processing portion 1t, a cell extracting portion 1w, and a CLP conversion portion 1y, as shown in FIG. 2.

The CPU 1a executes a computer program stored in the RAM 1b or the ROM 1c so as to perform the entire control of the communication device 1. Namely, a part of functions of the communication device 1 is realized by the computer program as software.

The ATM interface 1e is an interface for making connection between the communication device 1 and the ATM device 5 physically via a cable or a wireless line. The Ethernet interface 1f is an interface for making connection between the communication device 1 and the wide area Ethernet 4 physically via a cable or a wireless line. The LAN switch 1g performs a switching control of frames and a termination process. The ATM switch 1h performs a switching control of ATM cells and the like. Namely, the communication device 1 is an ATM device viewed from the ATM device 5 and an Ethernet device viewed from a device within the wide area Ethernet 4. Other structures of the communication device 1 will be described later one by one.

Next, an example where data are sent from one of the ATM devices 5 to the other ATM device 5 will be exemplified for describing a structure and a process in each portion of the communication device 1 shown in FIG. 2 with dividing roughly into each function.

Hereinafter, the ATM device 5 on a data transmission side and the ATM device 5 on a data reception side are distinguished and referred to as a "first ATM device 51" and a "second ATM device 52", respectively. In addition, the communication device 1 that is connected to the first ATM device 51 via the ATM interface 1e and the communication device 1 that is connected to the second ATM device 52 via the ATM interface 1e may be distinguished and referred to as a "first communication device 11" and a "second communication device 12", respectively.

[Function About Clock Synchronization]

Figure 3:
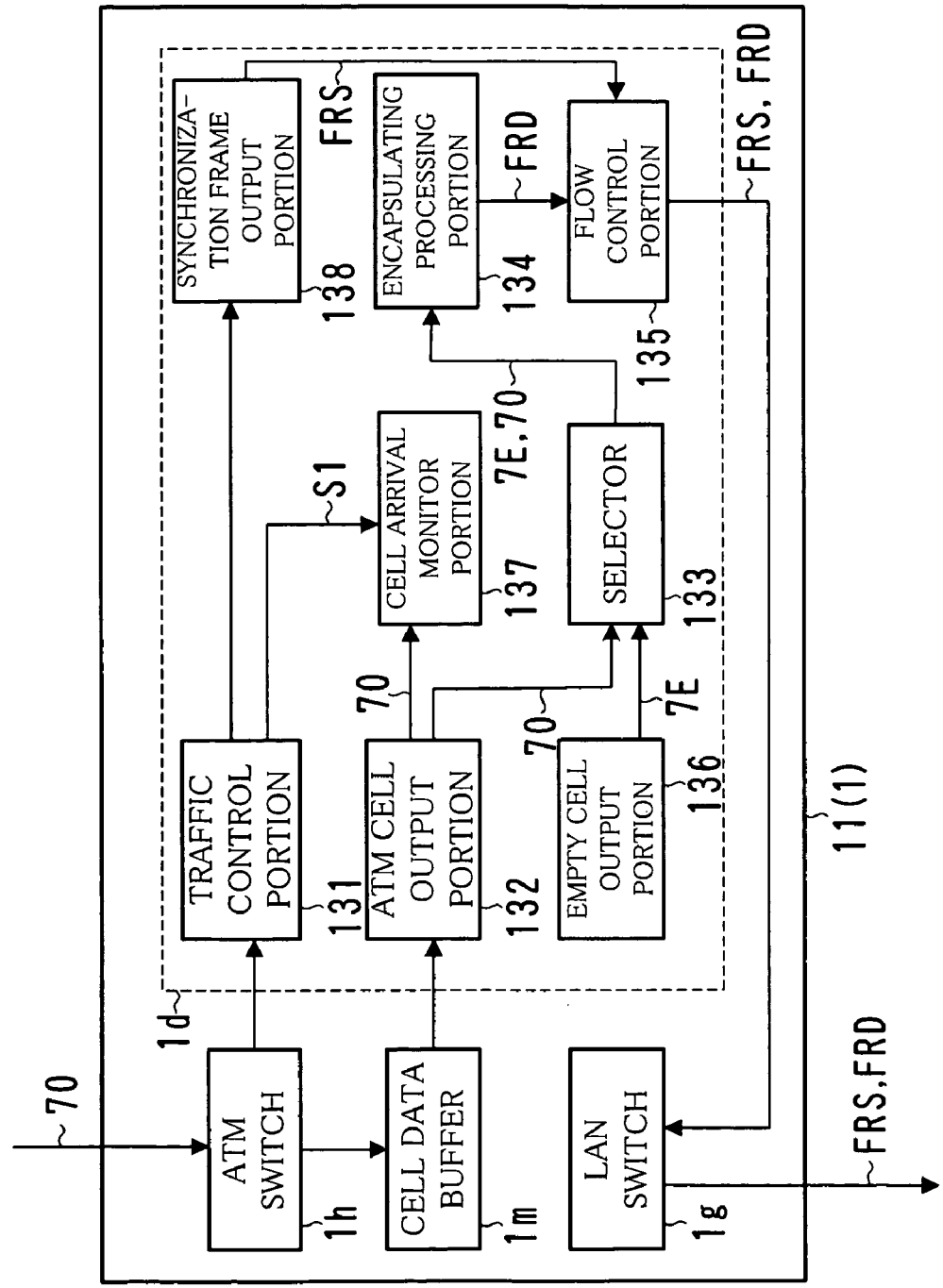
FIG. 3 shows an example of a structure of a first communication device for realizing a function about clock synchronization.
Figure 4:
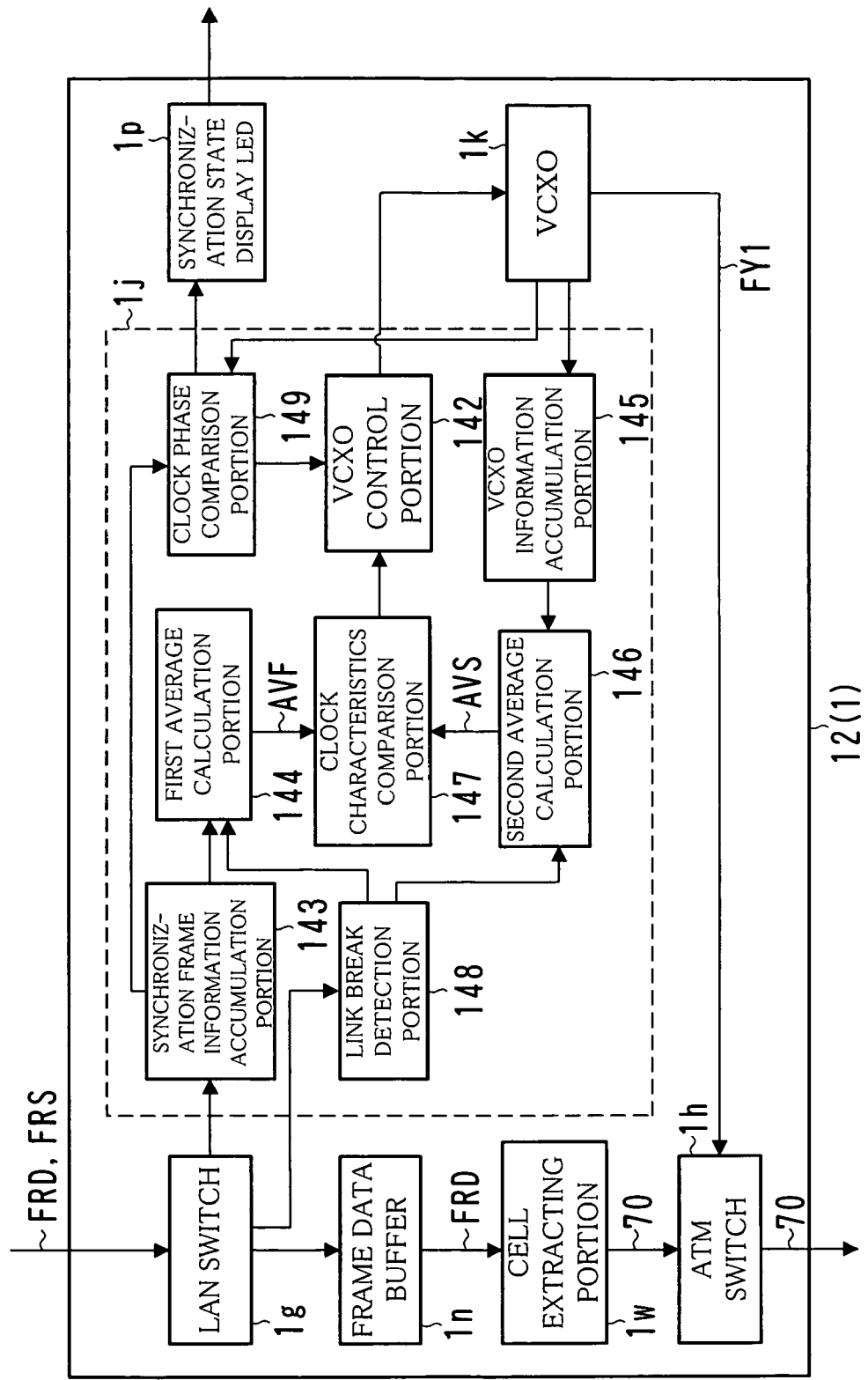
FIG. 4 shows an example of a structure of a second communication device for realizing a function about clock synchronization.
Figure 5:
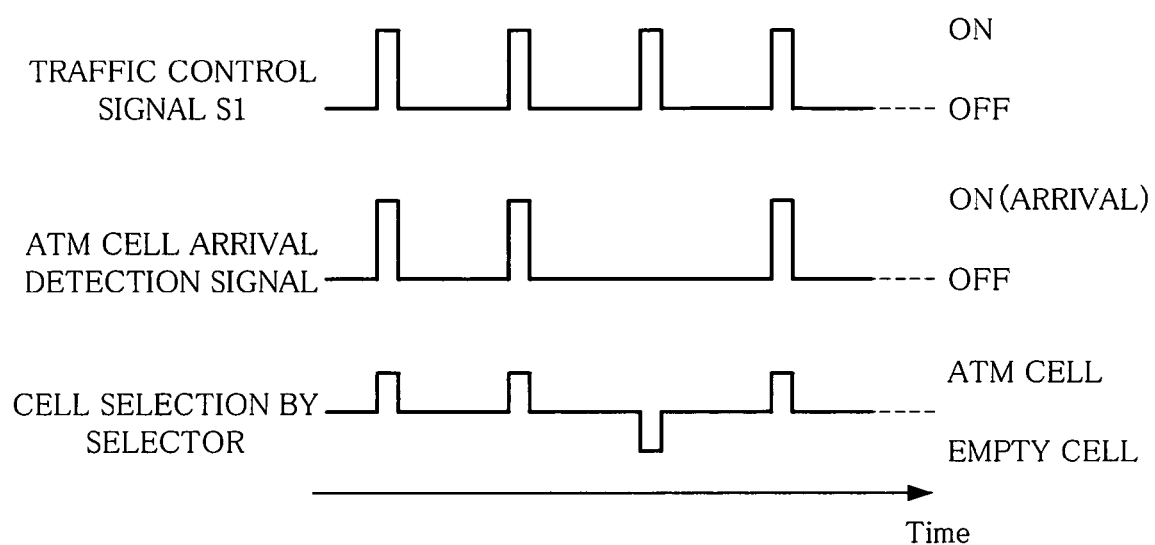
FIG. 5 shows timings for selecting an ATM cell and an empty cell.
Figure 7:
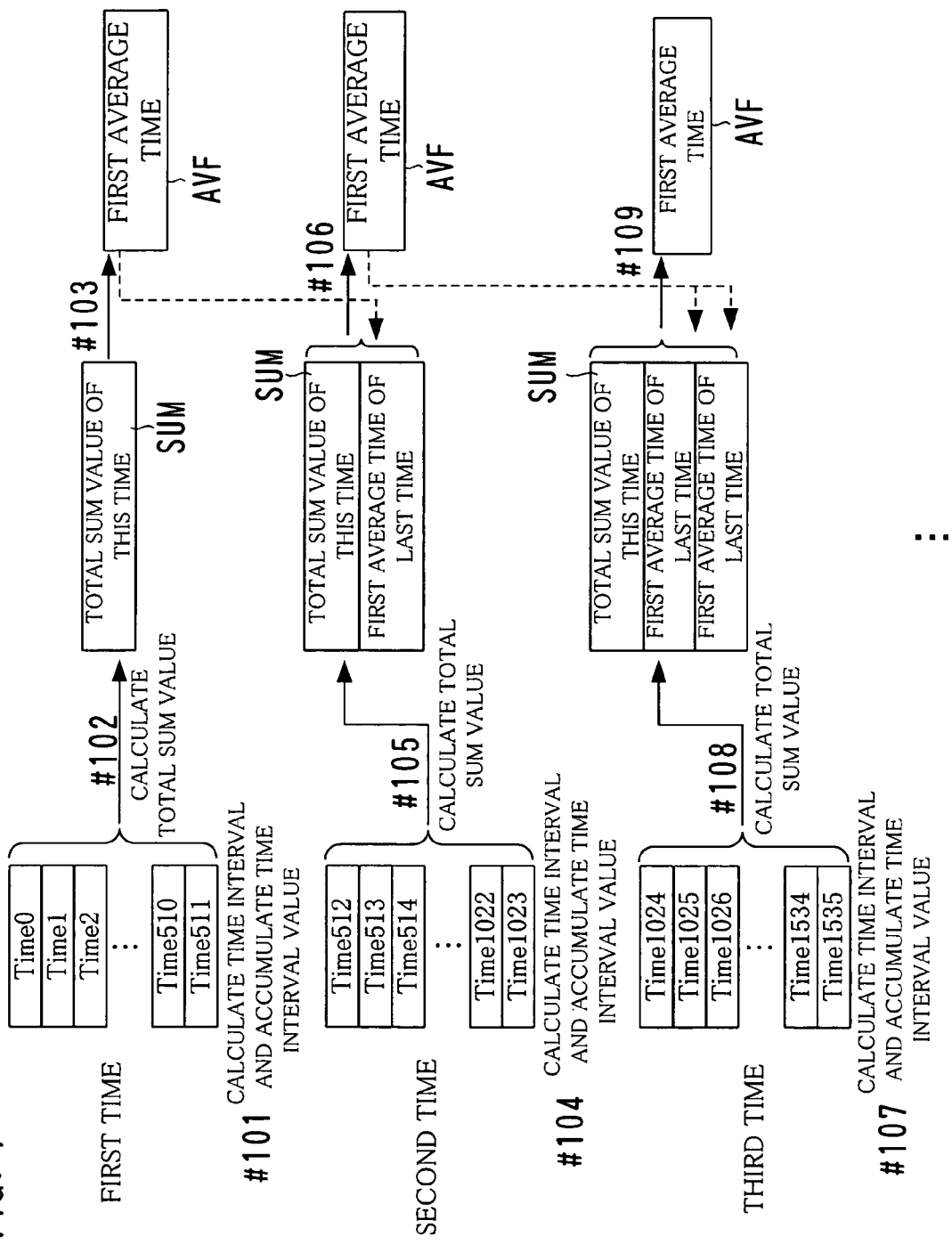
FIG. 7 shows an example of a method for calculating a first average time at an initial stage.
Figure 8:
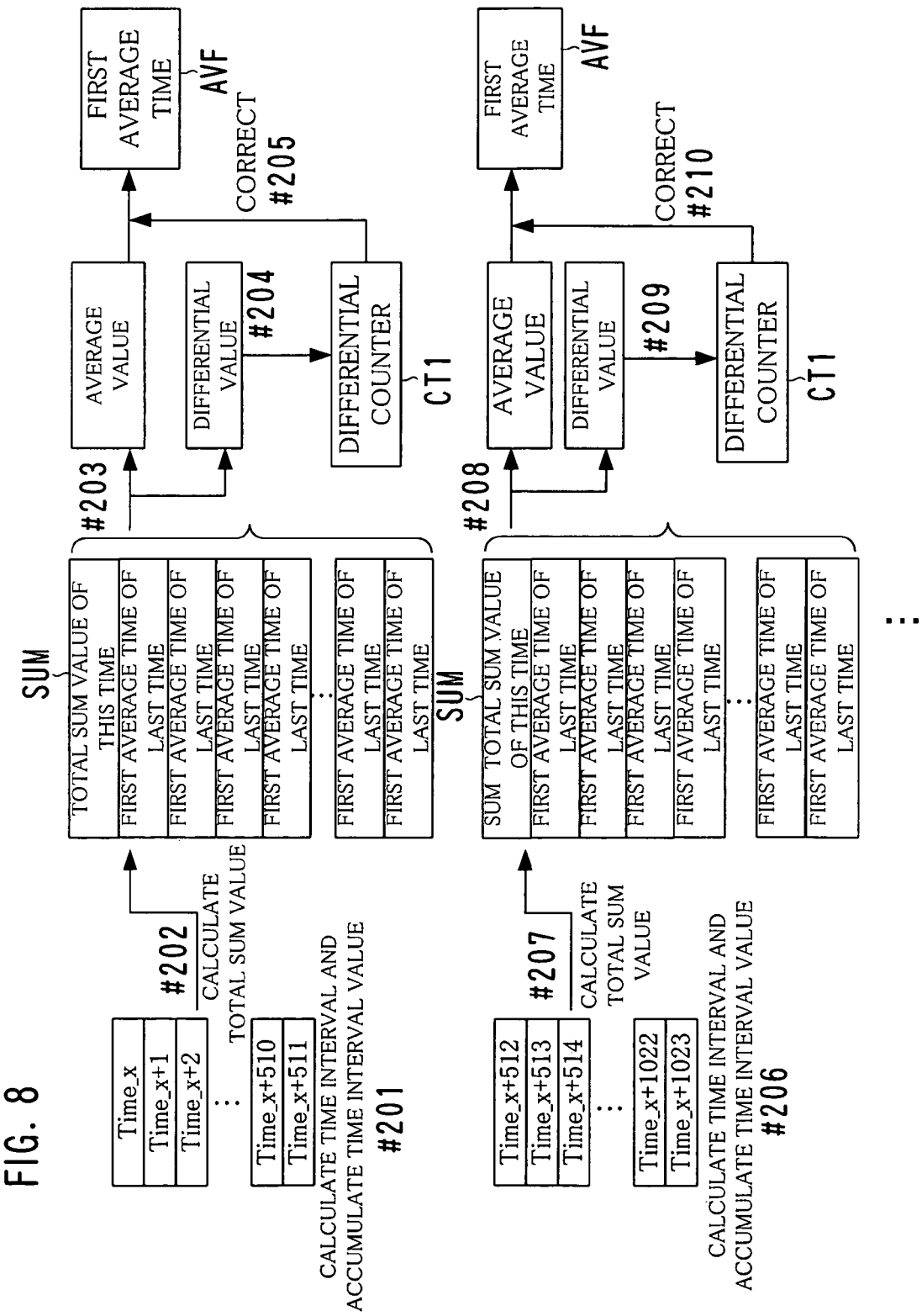
FIG. 8 shows an example of a method for calculating the first average time after performing the calculation a predetermined number of times.
Figure 9:
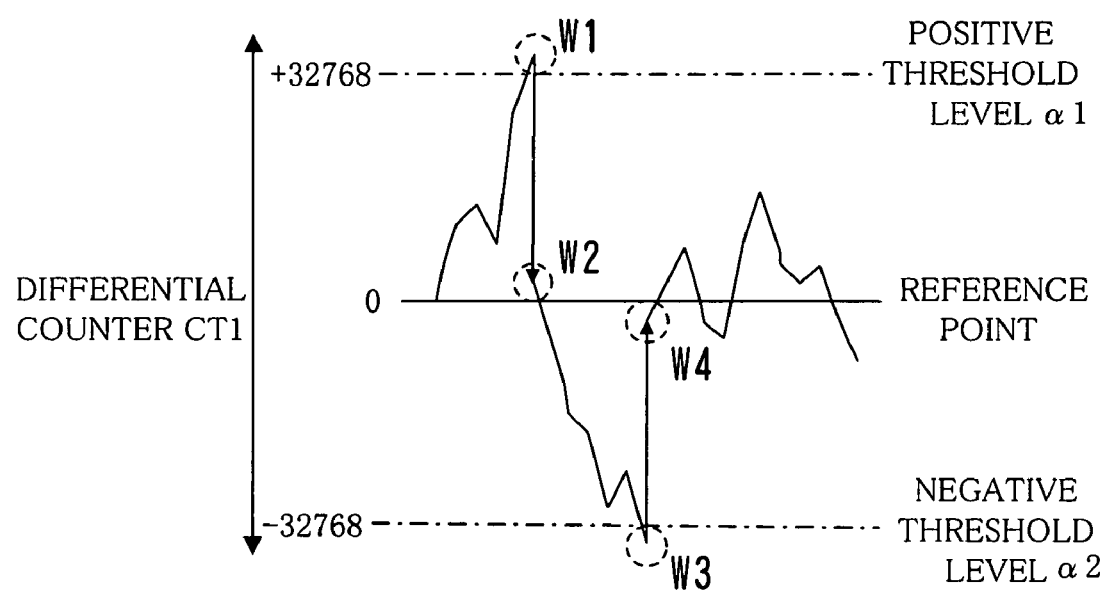
FIG. 9 shows an example of a variation of an accumulated value in a differential counter.
Figure 10:
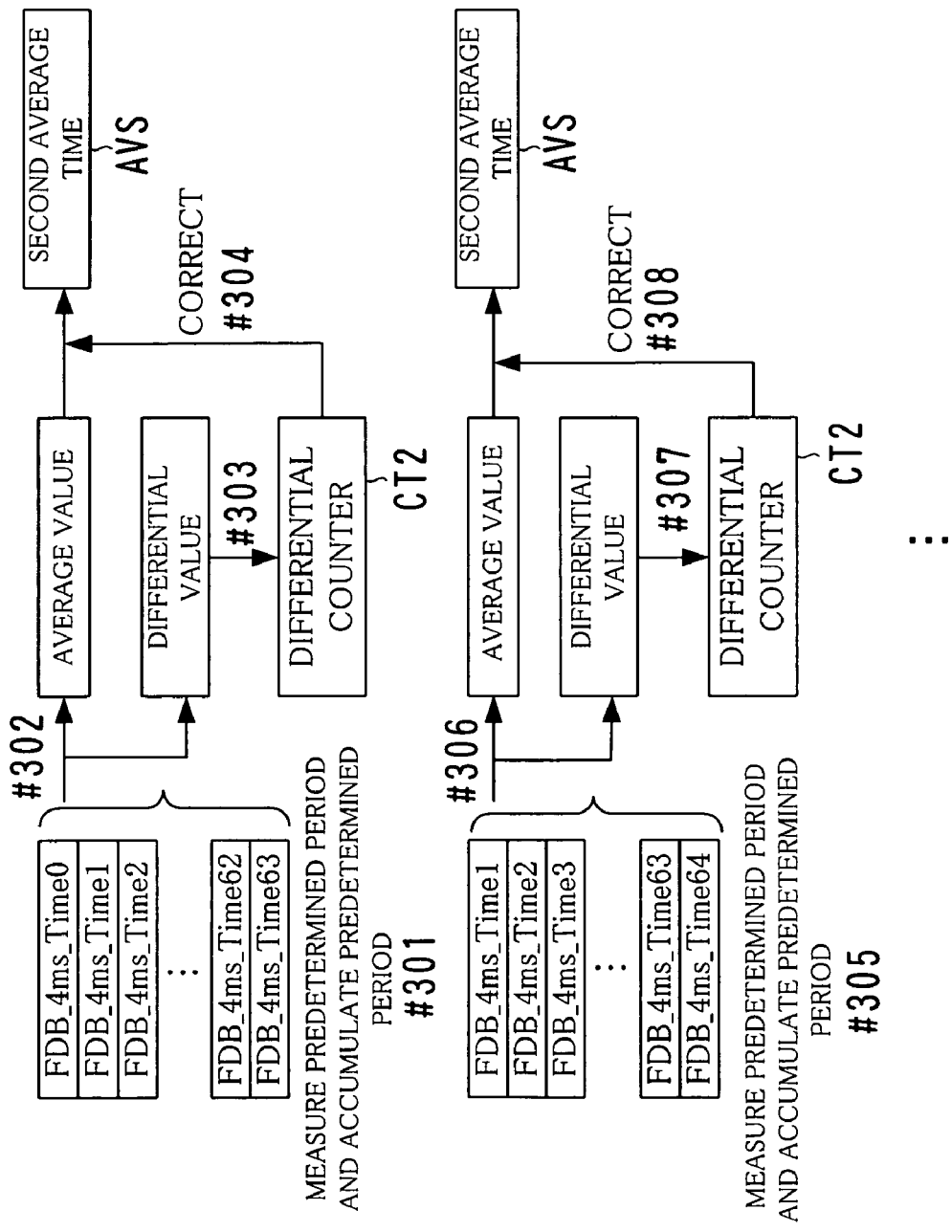
FIG. 10 shows an example of a method for calculating a second average time.
Figure 11:
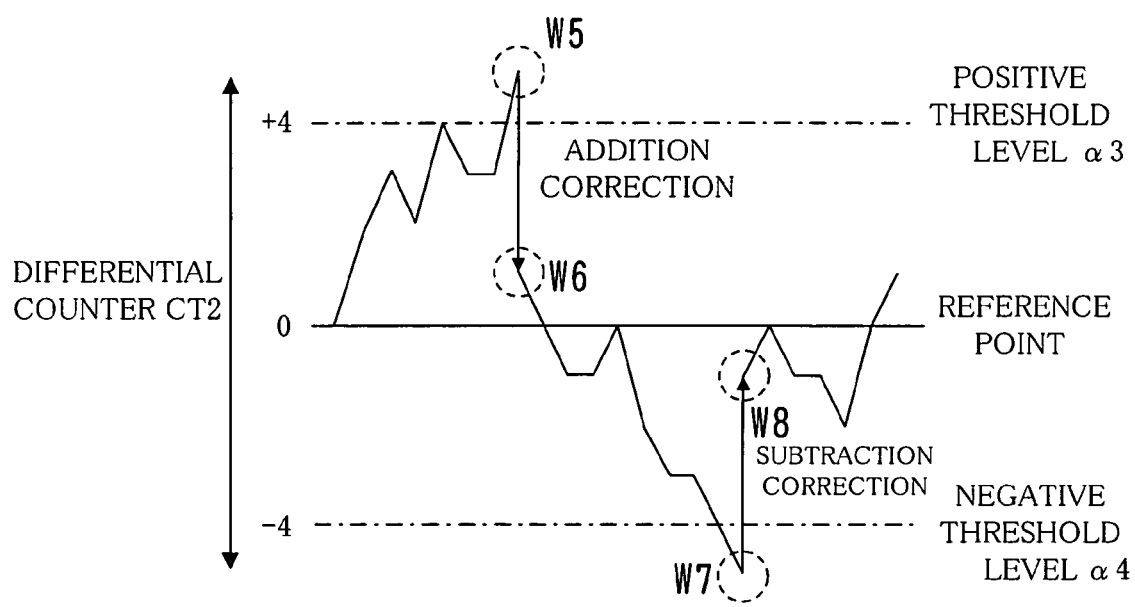
FIG. 11 shows an example of a variation of an accumulated value in a differential counter.

FIG. 3 shows an example of a structure of the first communication device 11 for realizing a function about clock synchronization, FIG. 4 shows an example of a structure of the second communication device 12 for realizing a function about clock synchronization, FIG. 5 shows timings for selecting a ATM cell 70 and an empty cell 7E, FIGS. 6(a)-6(c) show examples of formats of a synchronization frame FRS and a data frame FRD, FIG. 7 shows an example of a method for calculating a first average time AVF at an initial stage, FIG. 8 shows an example of a method for calculating the first average time AVF after performing the calculation a predetermined number of times, FIG. 9 shows an example of a variation of an accumulated value in a differential counter CT1, FIG. 10 shows an example of a method for calculating a second average time AVS, FIG. 11 shows an example of a variation of an accumulated value in a differential counter CT2, and FIGS. 12(a)-12(d) show examples of a method for adjusting phases of clocks.

Here, a function of transferring a data communication clock of the first ATM device 51, which is for sending data from the first ATM device 51 to the second ATM device 52, to the second ATM device 52 will be described. FIGS. 3 and 4 show structures of the first communication device 11 and the second communication device 12, respectively, which have strong connections with this function. FIGS. 14-17 and 19 that will be referred later also show structures having strong connection with each function.

In the first communication device 11, the ATM switch 1h shown in FIG. 3 receives the ATM cell 70 that was sent to the second ATM device 52 from the first ATM device 51. As described below, this ATM cell 70 is sent to the second ATM device 52 via the wide area Ethernet 4 and the second communication device 12. Namely, the first communication device 11 is also a device for relaying the ATM cell 70. In addition, the first communication device 11 is connected to the first ATM device 51 via the ATM interface 1e, so it obtains information of the data communication clock of the first ATM device 51 by communication with the first ATM device 51.

The frame transmission control portion 1d includes a traffic control portion 131, an ATM cell output portion 132, a selector 133, an encapsulating processing portion 134, a flow control portion 135, an empty cell output portion 136, a cell arrival monitor portion 137, and a synchronization frame output portion 138.

The traffic control portion 131 generates and delivers a traffic control signal S1 as shown in FIG. 5, so as to control a period for sending the ATM cell 70, i.e., a sending rate. The cell data buffer 1m accumulates temporarily the ATM cell 70 received from the first ATM device 51. The ATM cell output portion 132 retrieve the ATM cell 70 accumulated in the cell data buffer 1m in order of occurrence at the timing when the traffic control signal S1 is turned on, and it sends the ATM cell 70 to the encapsulating processing portion 134 via the selector 133.

The encapsulating processing portion 134 encapsulates the ATM cell 70 into a frame conforming to the protocol of the wide area Ethernet 4 (namely, a frame of IEEE802.3 format or the like). Namely, the ATM cell 70 is converted into an Ethernet frame.

The "encapsulating" means generating a frame including the ATM cell 70 embedded in a user data portion (USER-DATA) (see FIG. 6(a)). Hereinafter, a frame in which the ATM cell 70 is encapsulated is referred to as a "data frame FRD".

The flow control portion 135 controls the Ethernet interface 1f and the LAN switch 1g so that a frame such as the data frame FRD is sent to the wide area Ethernet 4.

If no ATM cell 70 to be sent to the encapsulating processing portion 134 is accumulated, a state where there is no data frame FRD to be sent to the second communication device 12 continues until the next ATM cell 70 arrives. Then, however, traffic between the first communication device 11 and the second communication device 12 in the network becomes unstable, so fluctuations of data communication between the communication devices (in particular, fluctuations of transmission of the synchronization frame FRS that will be described later) may occur.

Therefore, if no ATM cell 70 is accumulated in the cell data buffer 1m and there is not ATM cell 70 to be encapsulated, the data frame FRD is sent at a constant time period for stabilizing transmission of the synchronization frame FRS by the following method, for example.

The empty cell output portion 136 sends the empty cell 7E to the selector 133. The cell arrival monitor portion 137 detects whether or not the ATM cell output portion 132 has sent the ATM cell 70 to the selector 133, so as to detect whether or not the ATM cell 70 has arrived from the first ATM device 51. If the ATM cell 70 is detected, the selector 133 relays the ATM cell 70 sent from the ATM cell output portion 132 to the encapsulating processing portion 134 as shown in FIG. 5. If it is not detected, the empty cell 7E is selected to be relayed to the encapsulating processing portion 134 instead of the ATM cell 70.

When the empty cell 7E is received, the encapsulating processing portion 134 encapsulates the empty cell 7E to generate the data frame FRD instead of the ATM cell 70. Then, the flow control portion 135 sends the data frame FRD in which the empty cell 7E is encapsulated to the wide area Ethernet 4. Thus, a function of maintaining traffic constant within the network can be realized.

The synchronization frame output portion 138 divides a clock frequency of the first ATM device 51 into a predetermined value and sends continuously the synchronization frame FRS whose destination is the second communication device 12 to the flow control portion 135 in synchronization with the divided clock frequency. This synchronization frame FRS is a control frame for synchronizing with a clock of the first ATM device 51.

The flow control portion 135 sends the synchronization frame FRS received from the synchronization frame output portion 138 to the wide area Ethernet 4 in the same way as the case of the data frame FRD. However, in order to maintain a constant timing for sending the synchronization frame FRS, a higher priority is given to sending the synchronization frame FRS than sending the data frame FRD. For example, if both the data frame FRD and the synchronization frame FRS are received at the same time, the synchronization frame FRS is given a higher priority than the data frame FRD and is sent to the second communication device 12 first. Note that in this case, it is possible to adjust the entire data frame FRD that is sent to the wide area Ethernet 4 by discarding the data frame FRD in which the empty cell 7E is encapsulated.

The synchronization frame FRS also is constituted by the format supporting the wide area Ethernet 4 as shown in FIG. 6(a) similarly to the data frame FRD. In FIG. 6(a), a destination MAC address and a sender MAC address are stored in the fields of "D-MAC" and "S-MAC", respectively. Arbitrary value set by the system (an Ethernet type) is stored in the field of "TYPE".

In the field of "INFO", device inherent information within the frame is stored, and in this embodiment, discrimination information is stored, which is information for discriminating whether a type of the frame is a synchronization frame FRS or a data frame FRD by using partial bits of the field. In the field of "USER-DATA", a sequence number indicating an issue order is stored if the frame is a synchronization frame FRS, while the ATM cell 70 or the empty cell 7E is stored if it is a data frame FRD as described before. Namely, data indicating the sequence number are encapsulated in the synchronization frame FRS, while the ATM cell 70 or the empty cell 7E is encapsulated in the data frame FRD. In the field of "FCS", a value for frame check sequence is stored.

It is possible to use a format except the format shown in FIG. 6(a) as a format of these frames. For example, it is possible to use a format of a frame having an Ethernet length field for setting a frame length and LLC/SNAP header as shown in FIG. 6(b). It is possible to use a format with the Ethernet length and without the LLC/SNAP header as shown in FIG. 6(c).

The synchronization frame FRS and the data frame FRD bound for the wide area Ethernet 4 are sent to the second communication device 12 via a relay device or the like on the wide area Ethernet 4. In this way, the function of data communication with the second communication device 12 can be realized by encapsulating data into a frame of the Ethernet format as an interface conversion from the ATM network to the wide area Ethernet 4.

In the second communication device 12, the frame data buffer 1n shown in FIG. 4 temporarily accumulates frames received from other devices via the wide area Ethernet 4. The synchronization frame FRS and the data frame FRD that are received from the first communication device 11 are also accumulated in the frame data buffer 1n. In addition, the time when the synchronization frame FRS is received is recorded.

The cell extracting portion 1w extracts the ATM cell 70 from the received data frame FRD. Namely, the data frame FRD is converted into the ATM cell 70. Then, the ATM interface 1e and the ATM switch 1h perform a process for sending the extracted ATM cell 70 to the second ATM device 52 in accordance with the clock frequency delivered from the VCXO 1k. However, if the empty cell 7E is extracted, it is discarded, and the sending process is not performed.

As described before, however, it is necessary to give information of the clock of the first ATM device 51 to the second ATM device 52 in order to send the ATM cell 70 from the first ATM device 51 to the second ATM device 52. Therefore, the DSP 1j measures the clock frequency of the first ATM device 51 (hereinafter, referred to as a "sender clock frequency FY1") so as to adjust phases, and it gives the information of the clock to the second ATM device 52.

The clock of the first ATM device 51 can be reproduced in accordance with a time interval of receiving the plural synchronization frames FRS that are continuously sent from the first communication device 11. For example, a reception period of the synchronization frame FRS is determined in accordance with the time interval. Then, the sender clock frequency FY1 can be determined in accordance with a relationship (i.e., division ratio) between the real clock period of the first ATM device 51 and the transmission period of the synchronization frame FRS. For example, if the division ratio is 1/10000, the sender clock frequency FY1 can be determined by multiplying the reception period of the synchronization frame FRS by 10000.

However, since the synchronization frame FRS is received by way of the wide area Ethernet 4, fluctuations can be generated instantaneously or temporarily during the reception period. In this case, the sender clock frequency FY1 may be measured in accordance with irregular data, and there is a potential of large error in the measurement result.

Therefore, in order to enhance accuracy of the measurement result of the sender clock frequency FY1 with being affected by characteristics of the wide area Ethernet 4 as little as possible, it is preferable to accumulate a lot of data about the reception period of the synchronization frame FRS and to measure the sender clock frequency FY1 in accordance with the accumulated data on an average basis as described below with reference to FIGS. 7 and 8. Hereinafter, an example of this measurement will be described.

The DSP $1j$ shown in FIG. 4 includes a VCXO control portion 142, a synchronization frame information accumulation portion 143, a first average calculation portion 144, a VCXO information accumulation portion 145, a second average calculation portion 146, a clock characteristics comparison portion 147, a link break detection portion 148, and a clock phase comparison portion 149. This structure enables a process for measuring the sender clock frequency FY1 and controlling the VCXO $1k$ so that the clock signal in synchronization with the sender clock frequency FY1 can be delivered.

The first average calculation portion 144 measures the sender clock frequency FY1 in accordance with the reception period of the synchronization frame FRS from the first communication device 11. In parallel with this, the second average calculation portion 146 measures a frequency of the clock signal delivered by the VCXO $1k$. The clock characteristics comparison portion 147 determines a differential between the measured sender clock frequency FY1 and the clock frequency of the VCXO $1k$. Then, if there is the differential, the VCXO control portion 142 controls the VCXO $1k$ by adjusting the voltage so that the clock frequency of the VCXO $1k$ becomes identical to the sender clock frequency FY1.

After starting the relay of the ATM cell 70 from the first ATM device 51 to the second ATM device 52, the process is performed in the procedure as shown in FIG. 7 for a while. Every time when receiving a new synchronization frame FRS (except for a first frame), the synchronization frame information accumulation portion 143 shown in FIG. 4 calculates a difference between the time when the synchronization frame FRS is received this time and the time when the synchronization frame FRS was received last time, so as to calculate the time interval of reception of both the synchronization frames FRS. Then, it accumulates time interval values a predetermined number (hereinafter referred to as a "reference number") (#101 in FIG. 7).

For example, the first communication device 11 sends the synchronization frame FRS in accordance with the clock frequency of 8 kHz. If the reference number is "512", the synchronization frame FRS is received approximately every 125 microseconds, so it takes approximately 64 milliseconds to accumulate the time interval values of the reference number.

The first average calculation portion 144 calculates a total sum value SUM of the values accumulated this time every time when the time interval values of the reference number are accumulated (#102), and it calculates the first average time AVF in accordance with the total sum value SUM and the first average time AVF that was calculated last time. However, there is not the first average time AVF of last time in a first time, so the total sum value SUM obtained in Step #102 is regarded as the first average time AVF of this time (#103).

After a second time until a predetermined number of times pass, the synchronization frame information accumulation portion 143 erases the time interval values of the reference number that were accumulated last time and accumulates new time interval values of the reference number in accordance with the reception time of the synchronization frame FRS that was received after that successively (#104). The first average calculation portion 144 calculates the total sum value SUM of these time interval values (#105) and calculates the first average time AVF of this time (n–th time) by substituting the total sum value SUM and the first average time AVF that was calculated last time ((n–1)th time) into the following equation (1) (#106).

The first average time AVF of this time=((total sum value SUM)+(first average time AVF of last time)×(n–1))/n (1)

Here, a quotient of division in the equation (1) is calculated to a predetermined place, and lower places are rounded off.

After calculation of the first average time AVF is repeated a predetermined number of times (for example, after 32768 times of calculation) a process of calculating the first average time AVF is repeated in a procedure as shown in FIG. 8.

In FIG. 8, the process in Steps #201 and #202 is basically the same as the case of Steps #104 and #105 shown in FIG. 7. Namely, the synchronization frame information accumulation portion 143 accumulates new time interval values of the reference number (#201). The first average calculation portion 144 calculates the total sum value SUM of these time interval values (#202).

The first average calculation portion 144 calculates the first average time AVF of this time by substituting the total sum value SUM and the first average time AVF calculated last time into the following equation (2) (#203).

The first average time AVF of this time=((total sum value SUM)+(first average time AVF of last time)×(m–1))/m (2)

Here, m in the equation (2) represents a predetermined natural number (for example, 32768).

In the case shown in FIG. 7, a quotient of division in the equation (1) was calculated to a predetermined place, and lower places were rounded off. However, in the case of FIG. 8, a quotient of division in the equation (2) is calculated to a predetermined place, and the remainder is accumulated in the differential counter CT1 so that accuracy of calculation of the first average time AVF is further improved (#204). However, if the first average time AVF of this time is more than or equal to the first average time AVF of last time, the remainder of a positive value is accumulated in the differential counter CT1. If the first average time AVF of this time is less than the first average time AVF of last time, the remainder of a negative value is accumulated in the differential counter CT1. Namely, it can be said that the remainder means a differential under a predetermined place between the first average time AVF of this time and the first average time AVF of last time. Since a positive value is accumulated or a negative value is accumulated in the differential counter CT1, the value of the differential counter CT1 increases or decreases as shown in FIG. 9.

Such differentials are accumulated, and the first average time AVF determined by the equation (2) is corrected as follows (#205). As shown by a dotted line frame W1 in FIG. 9, if a value of the differential counter CT1 becomes more than or equal to a positive threshold level a1 that is a positive value, the value determined by the equation (2) is corrected so that the first average time AVF becomes large by adding a predetermined value (a positive value) to the value determined by the equation (2). After the correction, as shown by a dotted line frame W2, the positive threshold level a1 is subtracted from the accumulated value of the differential counter CT1.

On the other hand, as shown by a dotted line frame W3 in FIG. 9, if a value of the differential counter CT1 becomes lower than or equal to a negative threshold level a2 that is a negative value, the value determined by the equation (2) is corrected so that the first average time AVF becomes small by subtracting a predetermined value (a positive value) from the value determined by the equation (2). After the correction, as shown by a dotted line frame W4, the negative threshold level a2 is subtracted from the accumulated value of the differential counter CT1. Namely, an absolute value of the negative threshold level a2 is added.

The positive threshold level a1 is "32768", for example, while the negative threshold level a2 is "−32768", for example.

If (negative threshold level a2)<(differential counter CT1)<(positive threshold level a1), the correction is not performed, and the first average time AVF determined by the equation (2) is used as the calculation result of this time by the first average calculation portion 144.

The VCXO information accumulation portion 145 and the second average calculation portion 146 shown in FIG. 4 perform the process for determining the second average time AVS about the output period of the clock signal of VCXO 1k for comparing with the latest first average time AVF determined by the first average calculation portion 144 in the procedure as shown in FIG. 10 in parallel with the process by the synchronization frame information accumulation portion 143 and the first average calculation portion 144.

The VCXO information accumulation portion 145 checks the clock signal produced by the VCXO 1k at an interval of a predetermined time (for example, every four milliseconds) and accumulates a length (time) corresponding to the predetermined period of the clock signal (for example, a period corresponding to approximately four milliseconds) (#301). Note that when determining the first average time AVF, a lot of data are accumulated and used considering fluctuations of the synchronization frame FRS as described before. However, the clock signal produced by the VCXO 1k can be checked directly, so credibility of each data is high. Therefore, it is not necessary to accumulate for use so much data.

When a predetermined number (for example, 64) of values are accumulated, the second average calculation portion 146 determines an average value of these values, which is regarded as the second average time AVS (#302).

However, the average value is determined to a predetermined place, and the remainder is accumulated in the differential counter CT2 for correcting the second average time AVS in the same manner as the case of measuring the first average time AVF as described with reference to FIG. 8 (#303). This remainder is also accumulated in the same manner as the case of the first average time AVF. Namely, if the second average time AVS obtained in Step #302 is more than or equal to the second average time AVS of last time, it is accumulated as a positive value in the differential counter CT2. If the second average time AVS obtained in Step #302 is less than the second average time AVS of last time, it is accumulated as a negative value in the differential counter CT2. Therefore, it can be said that this remainder means a differential under a predetermined place between the second average time AVS of this time and the second average time AVS of last time. Since a positive value is accumulated or a negative value is accumulated in the differential counter CT2, the value of the differential counter CT2 increases or decreases as shown in FIG. 11.

In accordance with a value of the differential counter CT2, the second average time AVS is corrected (#304). If a value of the differential counter CT2 becomes more than or equal to a positive threshold level a3 (for example, "+4") that is a positive value, correction is performed so that the second average time AVS determined in Step #302 becomes large by adding a predetermined value (a positive value). For example, the correction is performed in the case of a dotted line frame W5 shown in FIG. 11. After the correction, as shown by a dotted line frame W6, the positive threshold level a3 is subtracted from the accumulated value of the differential counter CT2.

On the other hand, if a value of the differential counter CT2 becomes lower than or equal to a negative threshold level a4 (for example, "−4") that is a negative value, the correction is performed so that the second average time AVS becomes small by subtracting a predetermined value (a positive value). For example, the correction is performed in the case of a dotted line frame W7. After the correction, as shown by a dotted line frame W8, the negative threshold level a4 is subtracted from the accumulated value of the differential counter CT2. Namely, the absolute value of the negative threshold level a4 is added.

If (negative threshold level a4)<(differential counter CT2)<(positive threshold level a3), the correction is not performed, and the second average time AVS determined in Step #302 is regarded as the result of this time calculated by the second average calculation portion 146.

After the second time, the leading (the oldest) value of the accumulated values is erased, and remaining (as shown in Step #305, for example, 63) values and a newly accumulated value are used for the same process as in Steps #302-#304, so as to determine the second average time AVS (#305 and subsequent steps).

The first average time AVF and the second average time AVS determined in this way indicate characteristics of the clock frequency (the sender clock frequency FY1) of the first ATM device 51 and characteristics of the clock frequency of the VCXO 1k of the second communication device 12, respectively. Therefore, the first average time AVF is compared with the second average time AVS so that a difference between the sender clock frequency FY1 and the clock frequency of the VCXO 1k of the second communication device 12 can be detected.

Note that constants and threshold levels that are used in FIGS. 7, 8 and 10, the equation (1), and the equation (2) are set so that the differential between the first average time AVF and the second average time AVS indicates the difference between the sender clock frequency FY1 and the clock frequency of the VCXO 1k of the second communication device 12.

The clock characteristics comparison portion 147 shown in FIG. 4 compares the latest first average time AVF calculated by the first average calculation portion 144 with the latest second average time AVS calculated by the second average calculation portion 146, so as to determine the difference between them. Then, the VCXO control portion 142 controls the VCXO 1k so that the difference becomes small. Namely, if a value of the second average time AVS is larger than a value of the first average time AVF, it can be considered that a clock frequency of the VCXO 1k of the second communication device 12 is higher than a sender clock frequency FY1, so the clock frequency of the VCXO 1k is controlled to be lowered. On the contrary, if a value of the second average time AVS is smaller than a value of the first average time AVF, the clock frequency of the VCXO 1k is controlled to be raised.

The link break detection portion 148 detects occurrence of a failure such as an upper network's failure, a physical interface's failure, or a disconnection of a cable (hereinafter, the failure is referred to as a "link break failure"). Then, after detecting that the link break failure is resolved so that the link state is recovered, the processes for synchronizing the clock frequencies are started again.

When the link break failure occurs, reception of the synchronization frame FRS from the upper network, i.e., from the first communication device 11 is stopped, so the calculation process of the sender clock frequency FY1 by the synchronization frame information accumulation portion 143 and the first average calculation portion 144 is stopped. However, the clock delivered by the VCXO 1k of the second communication device 12 continues to run by itself. However, after the link state is recovered, if the first average calculation portion 144 restarts the calculation using the calculation result before stopping, a large deviation can occur between the real sender clock frequency FY1 and the calculation result. Then, it may take a long time to adjust the clock frequency of the VCXO 1k to the sender clock frequency FY1.

Therefore, when the link break failure is detected, calculation and accumulation data in the past such as data for calculating the first average time AVF and the second average time AVS accumulated before the occurrence of the link break failure are cleared and are reset to an initial value when the second communication device 12 was activated. Then, after the link state is recovered, the calculation process is restarted from the beginning. Namely, since a clock frequency of the target of the reconnection is not known, the calculation and accumulation data in the past are cleared, and the calculation process is restarted. Thus, a time necessary for resynchronization can be shortened.

The clock phase comparison portion 149 compares a phase of the clock component CW1 reproduced by the synchronization frame FRS received from the first communication device 11 with a phase of the clock component CW2 of the VCXO 1k so as to determine a deviation between them. The phase difference is determined from a deviation between edges of both the clock components CW1 and CW2 (clock edges) as shown in FIGS. 12(a)-12(d), for example. The VCXO control portion 142 controls the VCXO 1k in accordance with the deviation so that the phase difference becomes as small as possible.

Figure 12:
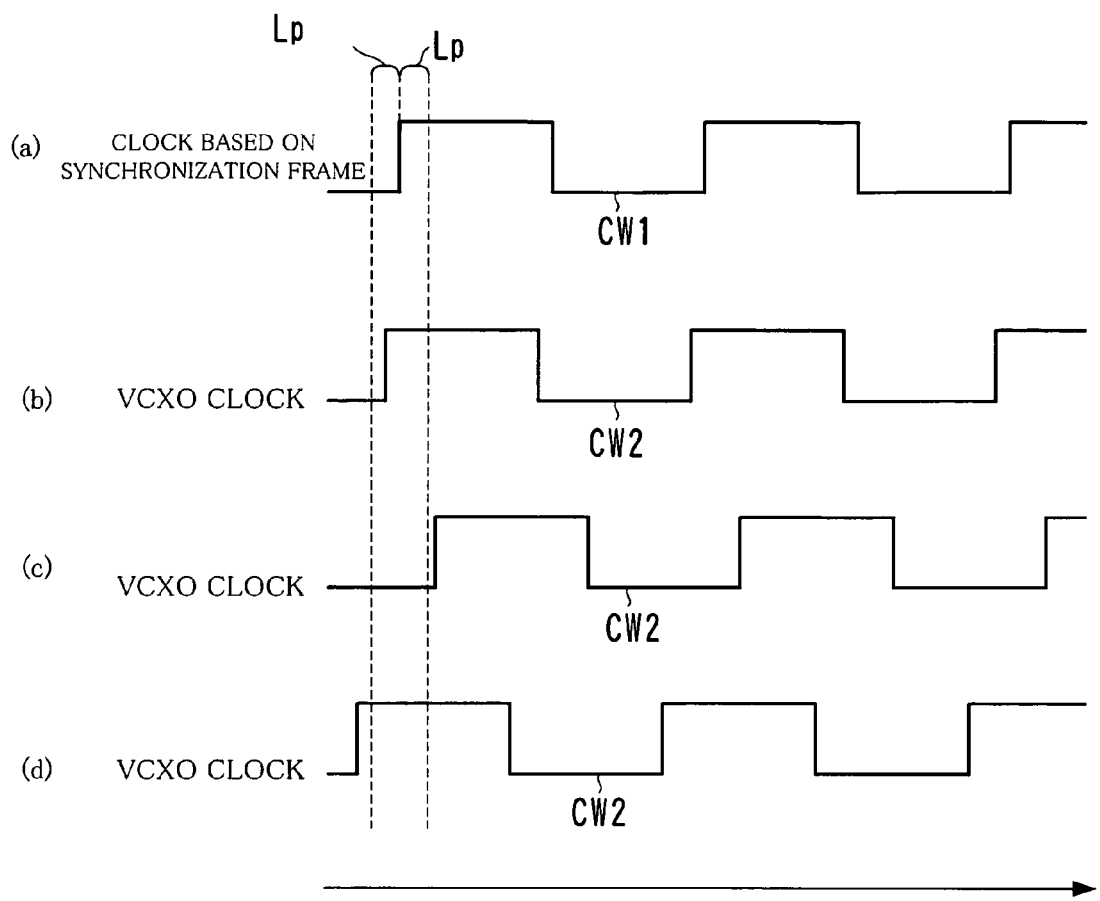
FIGS. 12(a)-12(d) show examples of a method for adjusting phases of clocks.

If the deviation between a phase of the clock component CW1 and a phase of the clock component CW2 is less than a threshold level Lp as shown in the relationship between FIGS. 12(a) and 12(b), the control for adjusting phases is not performed. Here, 0<(threshold level Lp)<1/2 period.

If a phase of the clock component CW2 is delayed by threshold level Lp or more from a phase of the clock component CW1 as shown in the relationship between FIGS. 12(a) and 12(c), the VCXO control portion 142 controls the clock frequency of the VCXO 1k to rise instantaneously so that the phase difference becomes small. On the other hand, if the relationship is opposite as shown in the relationship between FIGS. 12(a) and 12(d), the VCXO control portion 142 controls the clock frequency of the VCXO 1k to drop so that the phase difference becomes small.

The synchronization state display LED 1p shown in FIG. 4 is lighted to inform the user when it is detected that the deviation between the phase of the clock component CW1 and the phase of the clock component CW2 is more than or equal to the threshold level Lp. When a predetermined time has passed since the deviation becomes less than the threshold level Lp thanks to the control process by the VCXO control portion 142 (namely, a predetermined time has passed since returning to synchronization state), the synchronization state display LED 1p goes out.

By the process described above, the clock frequency of the VCXO 1k of the second communication device 12 is adjusted to the sender clock frequency FY1. Then, the second communication device 12 performs the communication with the second ATM device 52 via the ATM interface 1e in accordance with the clock signal received from the VCXO 1k, so that the clock information of the first ATM device 51 is sent to the second ATM device 52. Thus, the second ATM device 52 can synchronize the clock of the own device with the sender clock frequency FY1. As a result, it is possible to receive the ATM cell 70 sent from the first ATM device 51 via the first communication device 11, the wide area Ethernet 4 and the second communication device 12.

In addition, when the first communication device 11 sends the synchronization frame FRS continuously, an aging maintaining function of the MAC address can be realized in each relay device on the wide area Ethernet 4.

Namely, the synchronization frame FRS is sent from the first communication device 11 to the wide area Ethernet 4 with a fixed MAC address and is relayed by the relay devices successively. Then, each of the relay devices receives the synchronization frame FRS and every time refers to the MAC address table for checking the next relay device and resets an expiration limit timer of the MAC address in the MAC address table to an original MAX value.

In this way, the synchronization frame FRS is relayed by the relay devices successively from the first communication device 11 to the second communication device 12, so that the MAC address of the synchronization frame FRS remains without being forgotten from the MAC address table of the relay devices. Namely, the MAC address can be maintained without being aged out. Thus, a route of the synchronization frame FRS can be constant, and the fluctuations of the time interval for receiving the synchronization frame FRS in the second communication device 12 can be reduced. In addition, the destination MAC address and the sender MAC address of the Ethernet frame can be set fixedly for each relay device, so a unicast communication can be realized between the first communication device 11 and the second communication device 12.

[Function for Improving Accuracy of Measurement of Clock Frequency and Other Various Functions]

Next, a function for measuring the sender clock frequency FY1 with higher accuracy and other various functions will be described in turn.

[Interpolation Function of Data by Sequence Number and Function of Detecting State of Network]

Figure 13A:
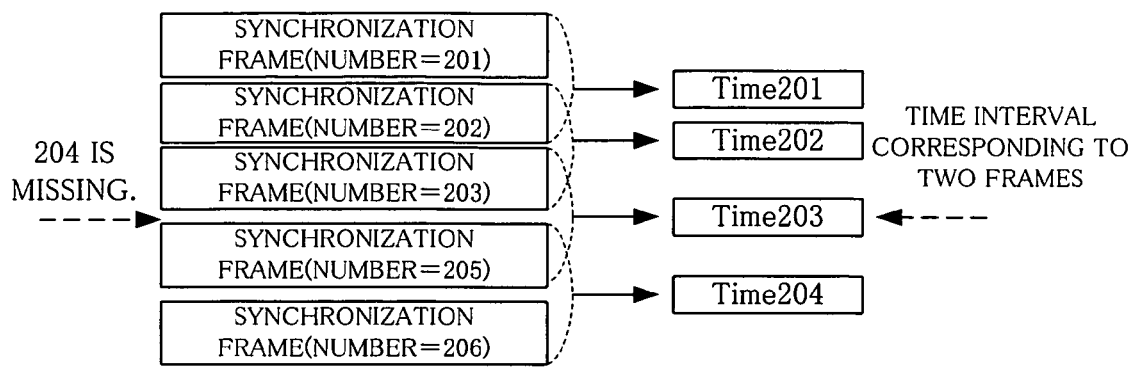
FIGS. 13(a) and 13(b) show an example of a method for interpolation of data frames.
Figure 13B:
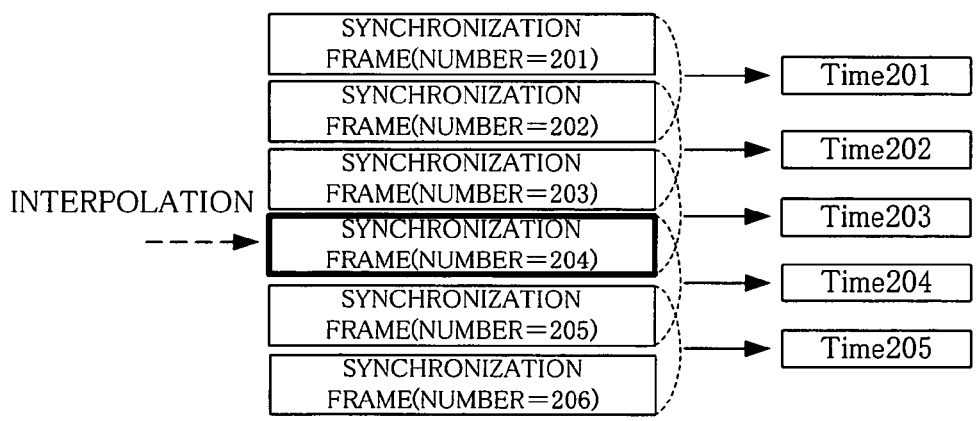

FIGS. 13(a) and 13(b) show an example of a method for interpolation of data frames FRD. As described above, the sequence number that indicates an issued order in the first communication device 11 is encapsulated in the synchronization frame FRS. The second communication device 12 performs a data interpolation process and a process of detecting a state of the wide area Ethernet 4 for synchronizing in accordance with the received plural synchronization frames FRS.

For example, as shown in FIG. 13(a), it is supposed that a missing synchronization frame FRS that did not reach the second communication device 12 is found as a result of checking the sequence number of the received synchronization frame FRS. However, if the calculation process of the first average time AVF that was described with reference to FIGS. 7 and 8 was performed in this state, data such as "Time203" that are not defined would be used.

Therefore, as shown in FIG. 13(b), an intermediate value of reception times of the synchronization frames FRS of the sequence numbers before and after the missing synchronization frame FRS is calculated and is regarded as a reception time of the missing synchronization frame FRS in the interpolation process. Thus, even if there is a synchronization frame FRS that did not reach correctly, deterioration of accuracy in calculation of the first average time AVF can be suppressed.

In addition, there is a case where synchronization frame FRS is not received in the order of the sequence number or where there is a missing synchronization frame FRS as described above. In this case, it is considered that an abnormal situation is generated in the wide area Ethernet 4. In addition, if a difference between reception times of any two neighboring synchronization frames FRS (a time interval) is substantially far from another difference between reception times of other two neighboring synchronization frames FRS (a time interval), it is considered that irregular transmission of the synchronization frame FRS has occurred.

Therefore, the second communication device 12 can monitor an abnormal condition of the wide area Ethernet 4 or a delay in transmission of the synchronization frame FRS by checking the sequence number and the reception time of the received synchronization frame FRS. Furthermore, in accordance with the monitoring result, the ATM device connection system 3 and the wide area Ethernet 4 can be administrated.

[Priority Transmission Function of Synchronization Frame FRS]

As described above, the first communication device 11 sends the data frame FRD and the synchronization frame FRS via the wide area Ethernet 4 in accordance with a protocol such as IEEE802.3x or the like. Therefore, transmission of the frames can be stopped or a transmission speed can be decreased by a flow control responding to conditions such as traffic of the wide area Ethernet 4, a situation of a relay device or a buffer of the second communication device 12. In this case, a frame before the transmission is accumulated in a buffer of the first communication device 11.

However, transmission of the synchronization frame FRS may also be delayed as a result, and it may be difficult to adjust the output frequency of the VCXO 1k to the sender clock frequency FY1 appropriately in the second communication device 12. Therefore, the flow control portion 135 of the first communication device 11 sets not to use the flow control for the synchronization frame FRS regardless of the conditions such as the buffer of the second communication device 12, and sends the synchronization frame FRS at a predetermined interval. Thus, the second communication device 12 can perform the synchronization with the first communication device 11 appropriately.

In addition, it is possible to realize a function of sending the synchronization frame FRS with a higher priority by using a format of a protocol such as IEEE802.1Q having a specification of priority control as the frame format. In this case, the first communication device 11 sets the user priority of the synchronization frame FRS so that the synchronization frame FRS becomes a priority frame. In addition, the LAN switch 1g (see FIG. 2) of the second communication device 12 is set that a frame of the highest priority is the synchronization frame FRS.

Thus, a delay of transmission of the synchronization frame FRS in the wide area Ethernet 4 can be reduced, and the synchronization frame FRS can be sent from the first communication device 11 to the second communication device 12 under a stable condition.

[Function of Transmitting Synchronization Frame FRS When Traffic is Heavy]

If traffic of the wide area Ethernet 4 is heavy, the synchronization frame FRS sent from the first communication device 11 may arrive at the second communication device 12 with a delay. Therefore, when the first communication device 11 detects that traffic of the wide area Ethernet 4 is heavy, it increases a degree of the division so that the transmission clock frequency of the synchronization frame FRS is lowered within the range that enables synchronization with the second communication device 12. For example, the clock frequency is divided into 8 kHz, 4 kHz, 2 kHz, . . . , corresponding to the traffic.

Thus, the second communication device 12 can perform the process for synchronizing while reducing traffic by decreasing frequency of sending the synchronization frame FRS.

[Buffer Control Function of Second Communication Device]

Figure 14:
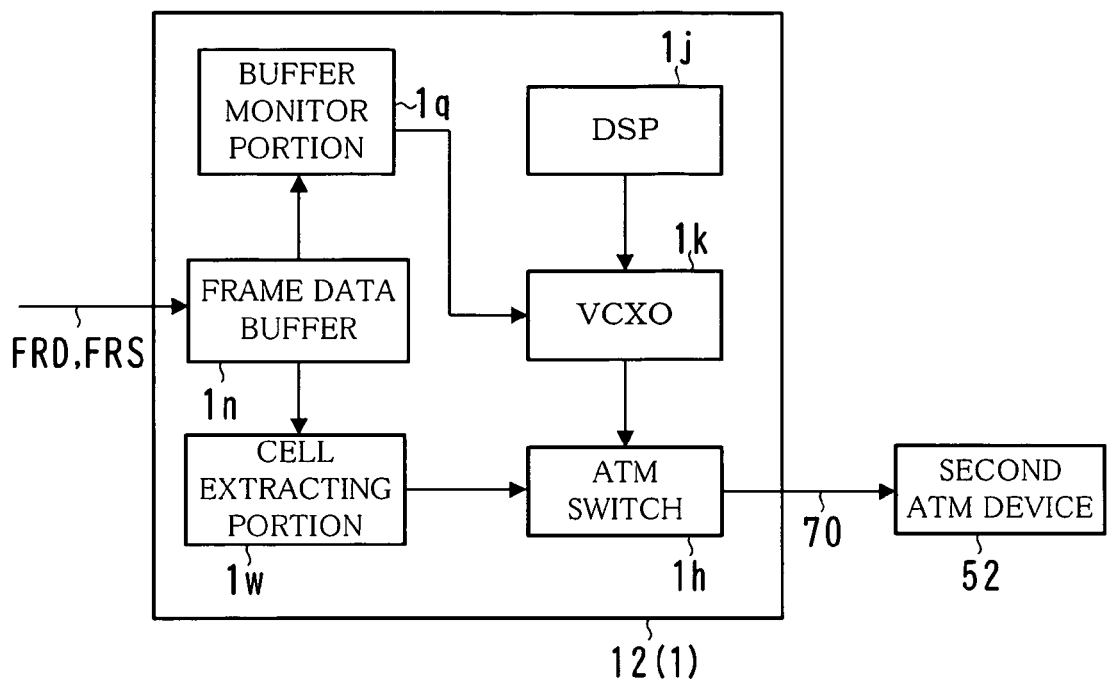
FIG. 14 shows an example of a structure of a second communication device for realizing a buffer control function.

FIG. 14 shows an example of a structure of a second communication device 12 for realizing a buffer control function. As described above, in the second communication device 12, the synchronization frame FRS and the data frame FRD sent from the first communication device 11 are accumulated in the frame data buffer in as shown in FIG. 14. Then, the synchronization frame FRS is used for synchronization with the first communication device 11, and the ATM cell 70 stored in the data frame FRD is sent to the second ATM device 52 in accordance with a clock signal delivered from the VCXO 1k.

However, these frames are sent via the wide area Ethernet 4. Therefore, reception of frames is concentrated so that there is a case where the number of reception of frames is larger than the number of transmission of the ATM cells 70. In this case, the number of frames accumulated in the frame data buffer 1n increases, so some frames may be abandoned because of overflow of the frame data buffer 1n.

Therefore, in order to secure sufficient available capacity of the frame data buffer 1n, a threshold level is set in advance, and the buffer monitor portion 1q monitors whether or not quantity of data accumulated in the frame data buffer in has exceeded this threshold level. When the buffer monitor portion 1q detects that quantity of the accumulated data has exceeded this threshold level, the DSP 1j raises a clock frequency of the VCXO 1k temporarily so that the transmission quantity of the ATM cells 70 is increased and quantity of data accumulated in the frame data buffer in is reduced.

Thus, discard of data in the frame data buffer in can be prevented. When quantity of data accumulated in the frame data buffer 1n goes back to the threshold level or less, the DSP 1j puts the clock frequency of the VCXO 1k back to the original state.

[Communication Function of OAM Cell]

Figure 15:
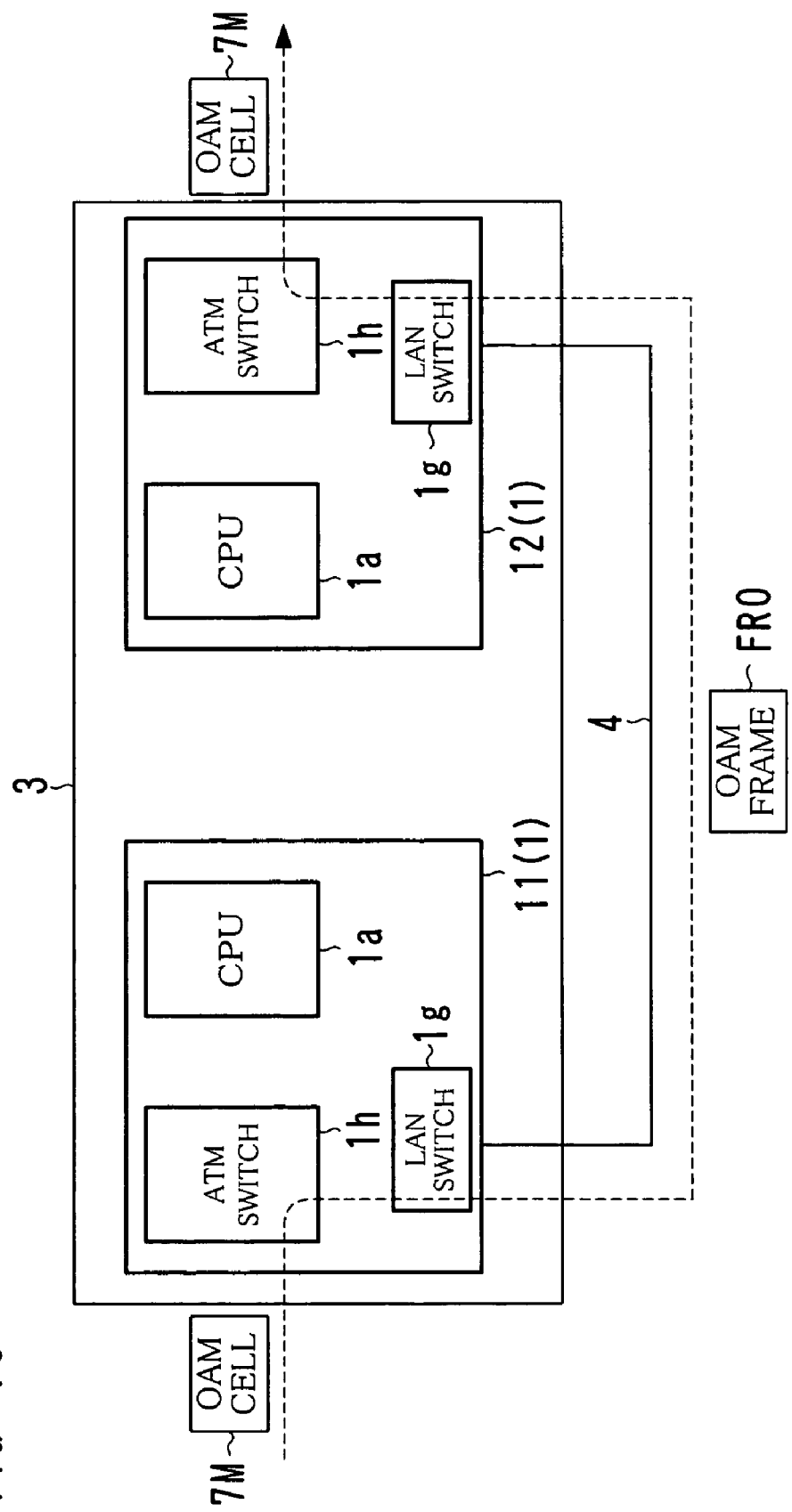
FIG. 15 shows an example of a communication function of an OAM cell.

FIG. 15 shows an example of a communication function of an OAM cell. The first ATM device 51 and the second ATM device 52 usually send and receive not only the ATM cell 70 but also OAM (Operation Administration and Maintenance) cell that is a cell for maintaining and administrating the network via the ATM network 9. The ATM device connection system 3 in this embodiment can also send the OAM cell in the same way as the case of the ATM cell 70 from the first ATM device 51 to the second ATM device 52 via the wide area Ethernet 4.

In FIG. 15, when the first communication device 11 receives the OAM cell 7M from the first ATM device 51, it encapsulates the OAM cell 7M to a frame conforming to a protocol of the wide area Ethernet 4 in the same manner as the case of the ATM cell 70. Hereinafter, the frame generated in this way is referred to as an "OAM frame FRO". Then, this OAM frame FRO is sent to the second communication device 12 via the wide area Ethernet 4 in the same manner as the case of the data frame FRD or the synchronization frame FRS.

When the second communication device 12 receives the OAM frame FRO, it decapsulates the OAM frame FRO in the same manner as the case of the data frame FRD so that the OAM cell 7M is extracted. Then, it sends the OAM cell 7M to the second ATM device 52 in accordance with a clock signal delivered from the VCXO 1k.

In this way, a special cell such as the OAM cell 7M can also be sent and received between the first ATM device 51 and the second ATM device 52 via the wide area Ethernet 4 by using the ATM device connection system 3.

[ATM Shaping Function]

Figure 16:
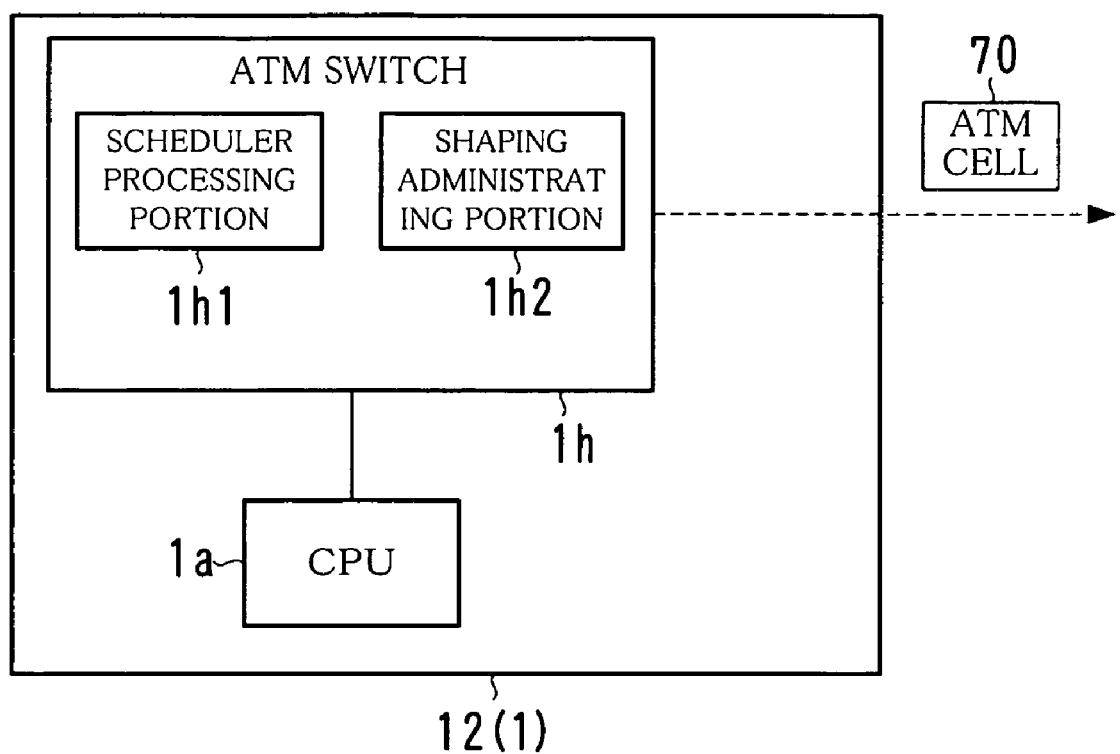
FIG. 16 shows an example of a structure of a second communication device for realizing an ATM shaping function.

FIG. 16 shows an example of a structure of a second communication device 12 for realizing an ATM shaping function. As shown in FIG. 16, the ATM switch 1h is provided with a scheduler processing portion 1h1, a shaping administrating portion 1h2 and the like.

It is desirable to consider influence of the second communication device 12 on the second ATM device 52 and other devices on the lower network and a load thereof when the ATM cell 70 is sent to the second ATM device 52. Considering this point, the ATM switch 1h of this embodiment performs the shaping of transmission of the ATM cell 70 as follows.

The shaping administrating portion 1h2 sets a rate of a shaping value. Namely, a transmission interval of the ATM cell 70 is set, and administration is performed so that an interval of transmitting cells is maintained at constant accuracy. Then, the scheduler processing portion 1h1 sends the ATM cell 70 to the second ATM device 52 responding to permission of sending cells that is performed in accordance with a rate of the shaping value.

[Setting Function of VLAN-TAG Priority Information in Accordance with CLP value]

Figure 17:
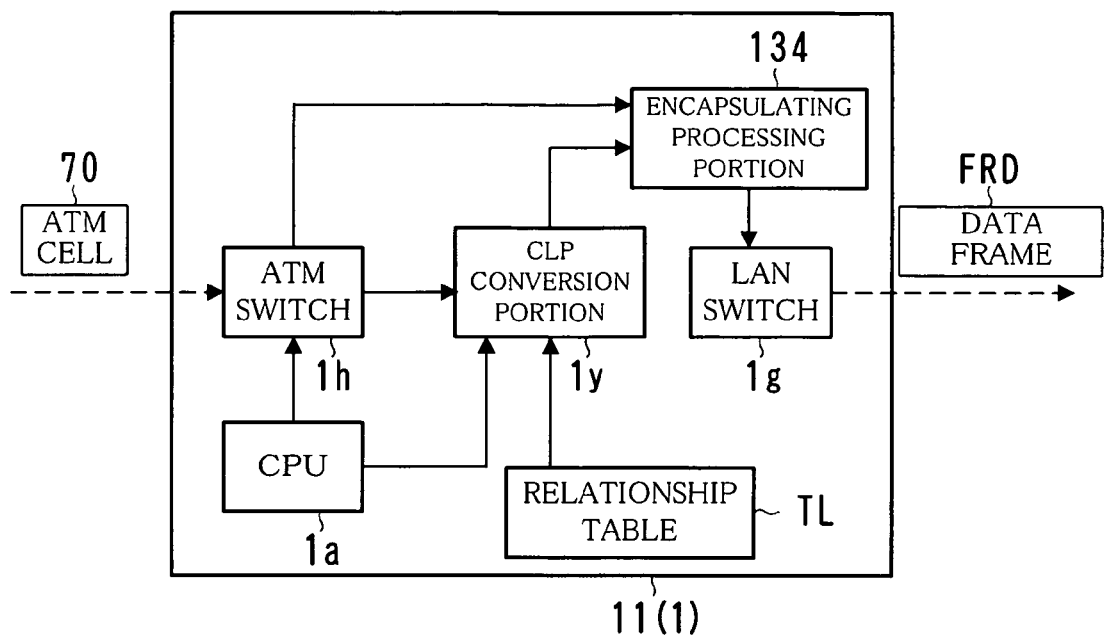
FIG. 17 shows an example of a structure of a first communication device for realizing a setting function of VLAN-TAG priority information in accordance with a CLP value.

FIG. 17 shows an example of a structure of a first communication device 11 for realizing a setting function of VLAN-TAG priority information in accordance with a CLP value. The first communication device 11 is provided with a function for setting priority information in VLAN-TAG of a frame in an Ethernet in accordance with set information of a CLP (Cell Loss Priority) of the ATM cell (hereinafter referred to as a "CLP value").

In general, a priority order for abandoning when congestions or the like occurs in the ATM network is set in the CLP of the ATM cell. On the other hand, a priority order for sending (priority information) can be set in the VLAN-TAG of a frame.

When the first communication device 11 encapsulates the ATM cell 70 sent from the first ATM device 51 to the data frame FRD, it sets the priority information in accordance with the CLP value of the ATM cell 70 as follows, for example.

In FIG. 17, a relationship table TL that indicates a relationship between the CLP value and the priority information in which the priority order of transmission becomes higher as the priority for abandoning is lower is set in the first communication device 11 in advance.

When the ATM cell 70 is received, the CPU 1a checks the CLP value that is set in the ATM cell 70 and informs the CLP conversion portion 1y. The CLP conversion portion 1y searches a value of the priority order of transmission corresponding to the informed CLP value from the relationship table TL. The encapsulating processing portion 134 sets the searched value in the priority information and encapsulates the ATM cell 70 in the data frame FRD. Then, the data frame FRD is transmitted to the second communication device 12.

In this way, a function of priority control can be realized for determining the priority order of the frame of the Ethernet in accordance with the CLP value of the ATM cell 70.

[Data Communication Function of One to Plural]

Figure 18:
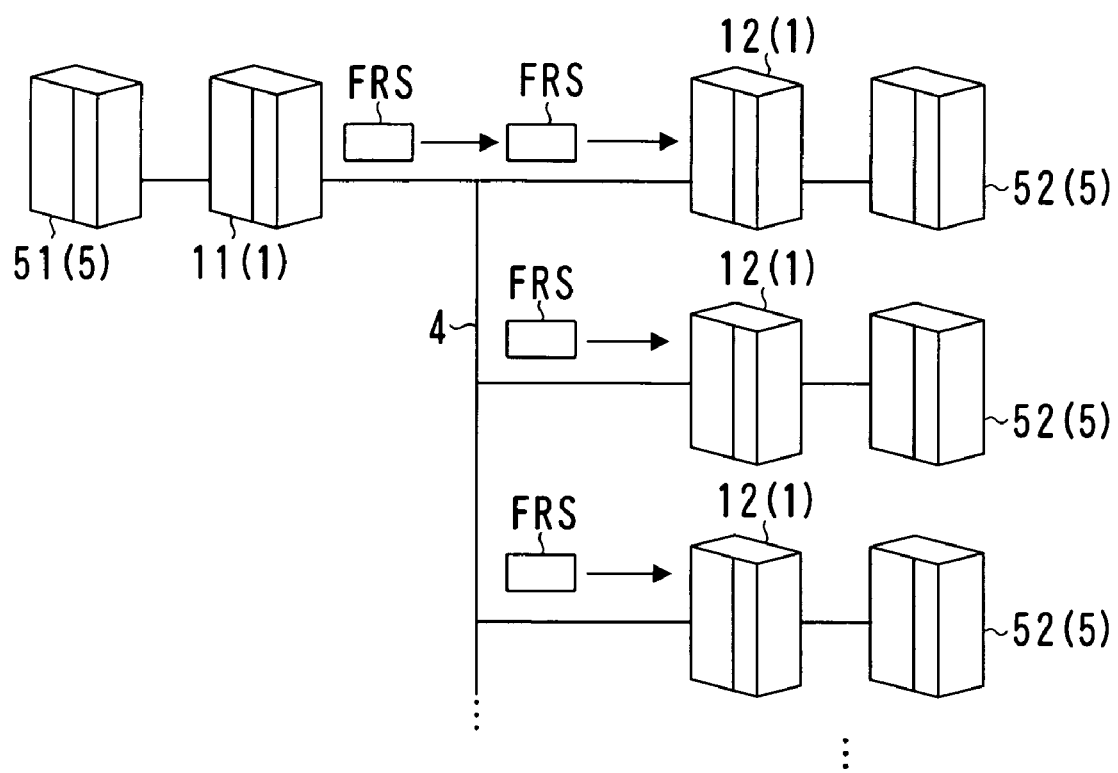
FIG. 18 shows an example of a method for sending data from a first communication device to plural second communication devices.

FIG. 18 shows an example of a method for sending data from a first communication device 11 to plural second communication devices 12. In each of the examples described above, the case is described in which the first communication device 11 and the second communication device 12 are connected one to one. The ATM device connection system 3 can be applied to the case where they are connected one to plural as shown in FIG. 18.

In this case, the first communication device 11 that is a master sends the synchronization frame FRS as a multicast frame to the second communication devices 12 that are slaves. Each of the second communication devices 12 that has received the synchronization frame FRS performs synchronization of clock with the first communication device 11 in accordance with the method described above.

The ATM cell 70 is sent to the second ATM device 52 that is a destination as follows, for example. The second communication device 12 that is connected to the second ATM device 52 that is a destination of the ATM cell 70 is discriminated, and route information to the second communication device 12 on the wide area Ethernet 4 is obtained. The ATM cell 70 is encapsulated to the data frame FRD. The data frame FRD is sent to the wide area Ethernet 4 in accordance with the obtained route information.

In this way, the ATM device connection system 3 can be used also in the multiconnection structure of one to plural, so that data communication can be performed between the first ATM device 51 and the second ATM device 52 via the wide area Ethernet 4.

[VPI Reassigning Function]

Figure 19:
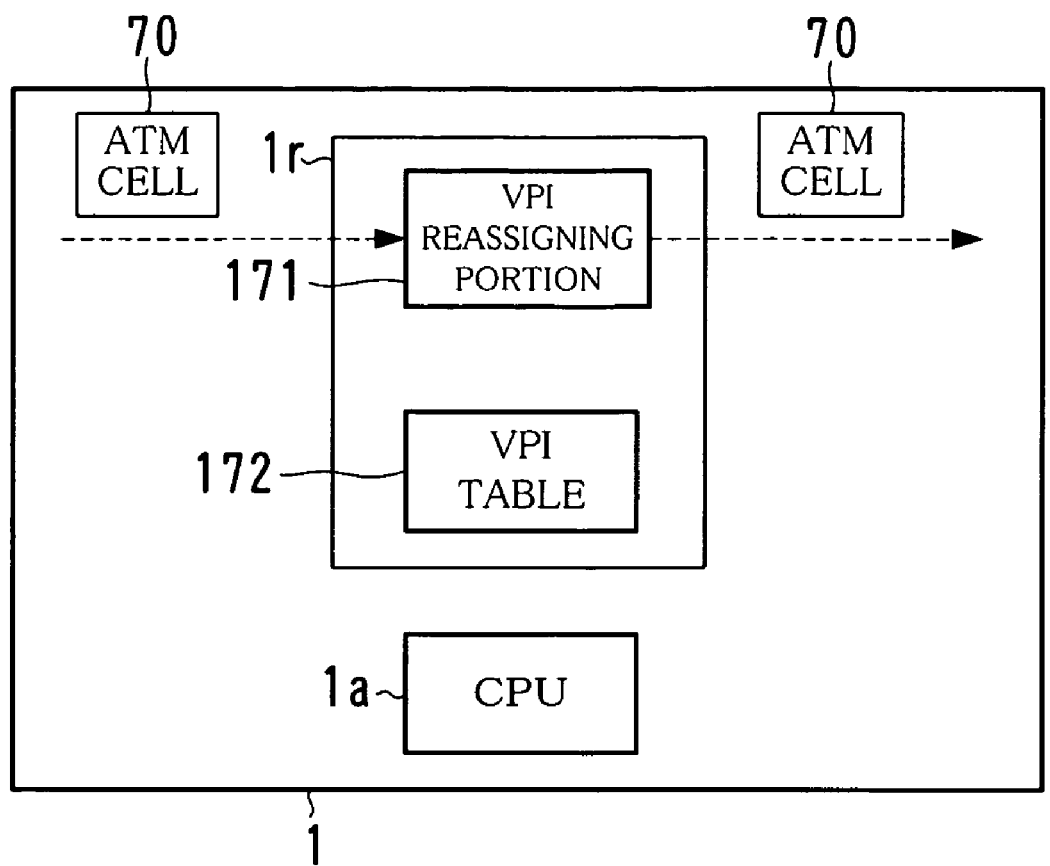
FIG. 19 shows an example of a structure of a communication device for realizing a VPI reassigning function.

FIG. 19 shows an example of a structure of a communication device 1 for realizing a VPI reassigning function. In general, a VPI (Virtual Path Identifier) of the ATM cell 70 is reassigned every time when being relayed by the ATM exchange. The communication device 1 of this embodiment is also provided with a function for reassigning the VPI of the ATM cell 70 in the same manner as the conventional ATM exchange.

The VPI processing portion 1r includes a VPI reassigning portion 171 and a VPI table 172 as shown in FIG. 19.

The VPI table 172 is a table in which reassigning information of the VPI is set. When the ATM cell 70 is entered, the CPU 1a reads a value that is set in the VPI (VPI value) of the ATM cell 70. The VPI reassigning portion 171 searches the VPI value of a transmission destination corresponding to the read VPI value from the VPI table 172. Then, the VPI value of the ATM cell 70 is converted (reassigned) into the searched VPI value. For example, if the entered VPI value of the ATM cell 70 is "A" and a VPI value of "B" is obtained as a result of searching the VPI table 172, the VPI value of the ATM cell 70 is converted into "B".

Figure 20:
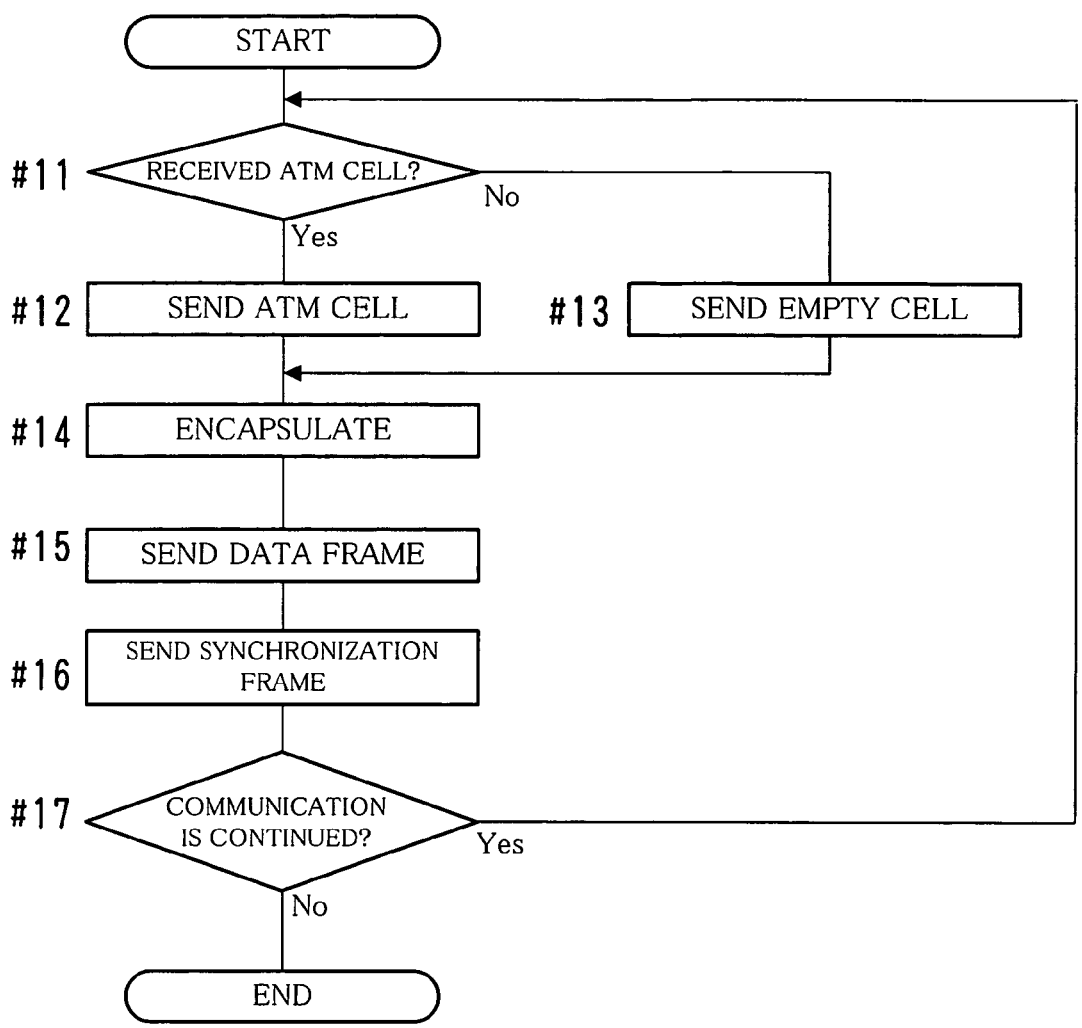
FIG. 20 is a flowchart showing an example of a flow of a general process of the first communication device.
Figure 21:
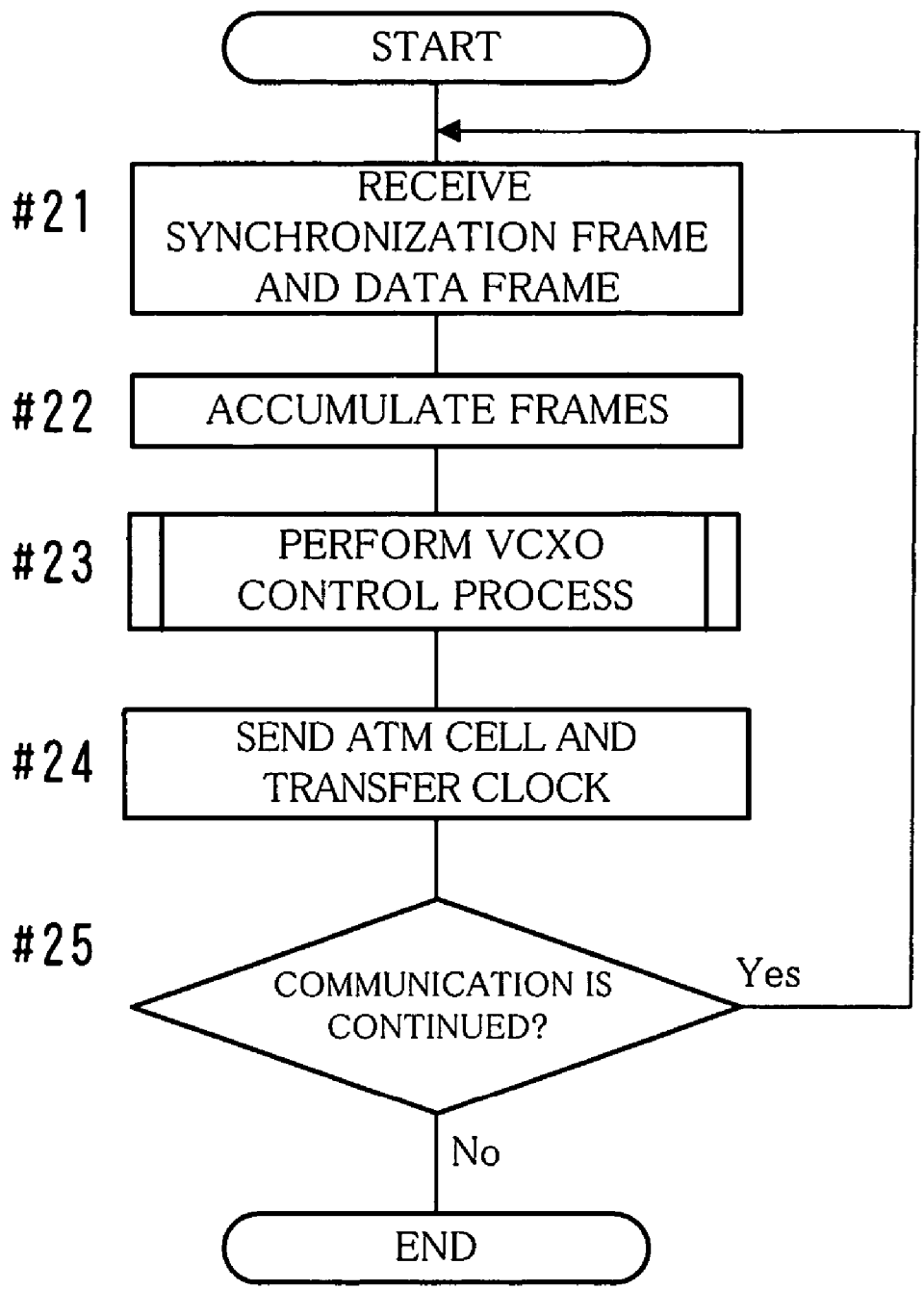
FIG. 21 is a flowchart showing an example of a flow of a general process of the second communication device.
Figure 22:
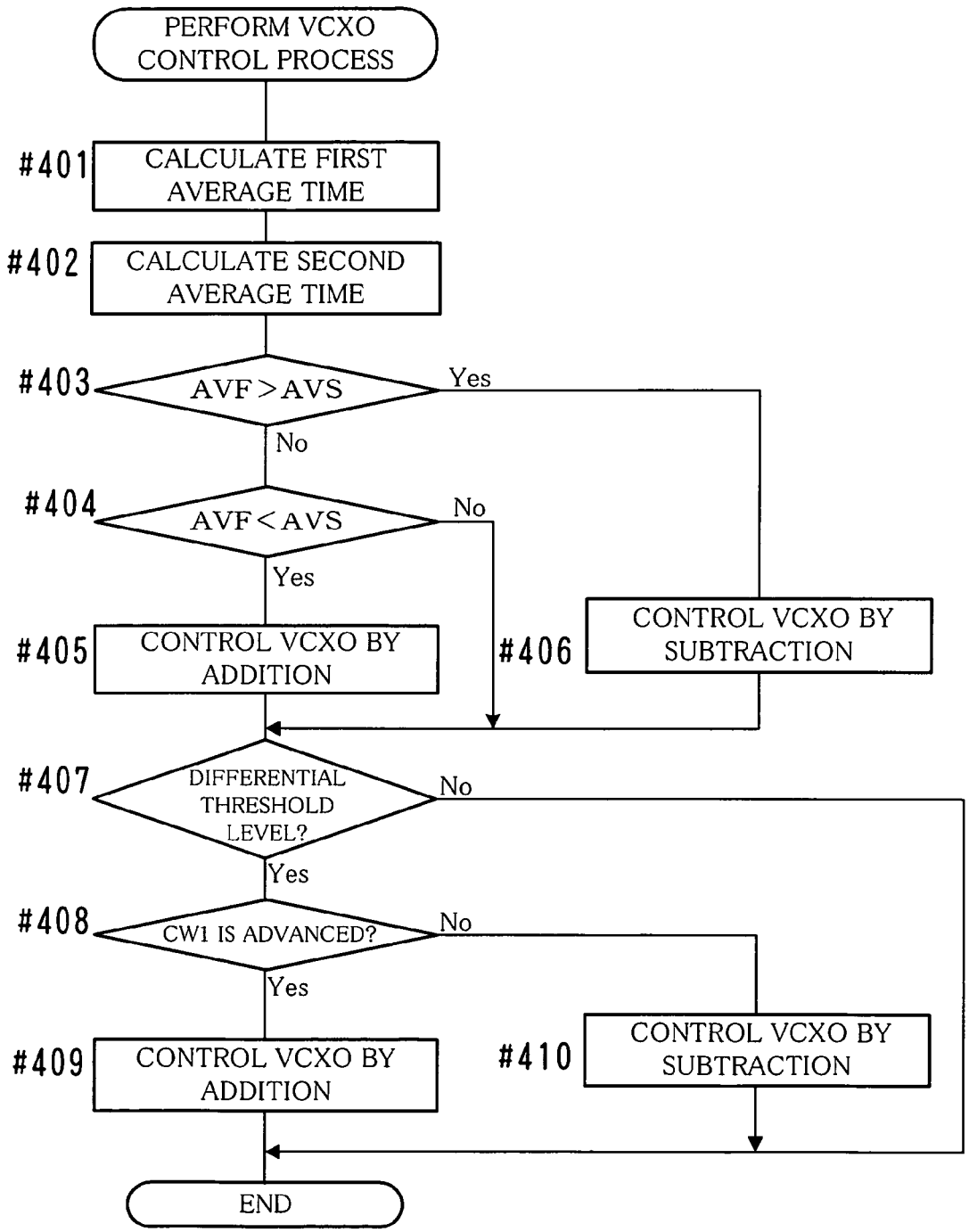
FIG. 22 is a flowchart showing an example of a flow of a VCXO control process.
Figure 23:
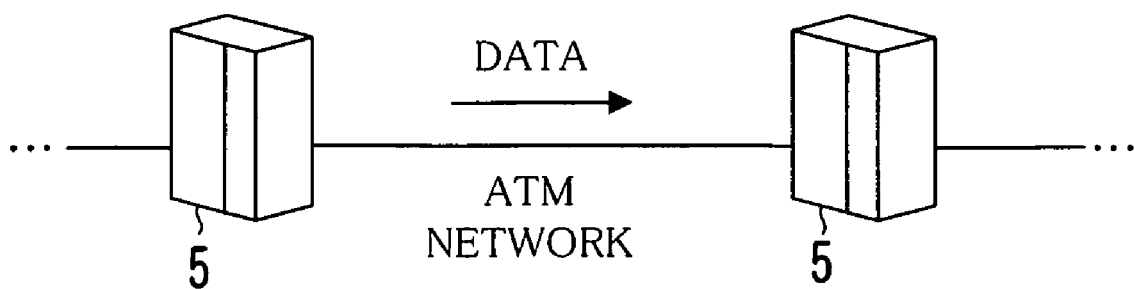
FIG. 23 shows a conventional method for connecting ATM devices.

FIG. 20 is a flowchart showing an example of a flow of a general process of the first communication device 11, FIG. 21 is a flowchart showing an example of a flow of a general process of the second communication device 12, and FIG. 22 is a flowchart showing an example of a flow of a VCXO control process.

Next, flows of processes of the first communication device, 11 and the second communication device 12 when relaying data transmission from the first ATM device 51 to the second ATM device 52 will be described with reference to the flowcharts.

In FIG. 20, when the first communication device 11 receives the ATM cell 70 from the first ATM device 51 (Yes in #11), the ATM cell 70 is sent to the selector 133 in synchronization with the traffic control signal S1 delivered from the traffic control portion 131 (see FIGS. 3 and 5) (#12). Then, the ATM cell 70 is encapsulated to be converted into the data frame FRD, which is sent to the wide area Ethernet 4 bound for the second communication device 12 (#15). However, if there is no ATM cell 70 to be sent to the selector 133 (No in #11), the empty cell 7E that is sent from the empty cell output portion 136 is selected (#13), and this is encapsulated to be converted into the data frame FRD (#14).

In parallel with the process in Steps #11 through #15, the synchronization frame FRS is sent to the wide area Ethernet 4 bound for the second communication device 12 every predetermined time (for example, in synchronization with a clock that is obtained by dividing the sender clock frequency FY1 to a predetermined frequency) (#16). Higher priority for transmission is given to the synchronization frame FRS than the data frame FRD.

During a period that communication with the first ATM device 51 is continued, the process in Steps #11 through #16 is repeated (Yes in #17).

In FIG. 21, when the second communication device 12 receives the data frame FRD or the synchronization frame FRS (#21), these frames are accumulated in the frame data buffer in (#22). Then, information about the sender clock frequency FY1 is obtained in accordance with the time interval of receiving the synchronization frame FRS, and a process for synchronizing the clock of the VCXO 1k with the clock measured by the data frame FRD is performed in accordance with the information (#23). This process is performed in the procedure as shown in FIG. 22, for example.

Namely, an average time (a first average time AVF) per predetermined period of a clock of the first ATM device 51 is calculated in accordance with the time interval of receiving the synchronization frame FRS (#401). As a method of calculating the first average time AVF, the method that was described before with reference to FIGS. 7 and 8 can be used, for example. It can be said that this first average time AVF indicates characteristics of a clock of the first ATM device 51.

In parallel with this, an average time (a second average time AVS) per predetermined period of a clock of the VCXO 1k of the second communication device 12 is calculated (#402). As a method of calculating the second average time AVS, the method that was described before with reference to FIG. 10 can be used, for example. It can be said that this second average time AVS indicates characteristics of a clock of the VCXO 1k of the second communication device 12.

If a value of the first average time AVF is larger than a value of the second average time AVS (Yes in #403 and No in #404), the clock frequency of the VCXO 1k of the second communication device 12 is higher than the clock frequency of the first ATM device 51. Therefore, it is controlled so that the clock frequency of the VCXO 1k becomes lower than the present value (#406).

If a value of the first average time AVF is smaller than a value of the second average time AVS (No in #403 and Yes in #404), the clock frequency of the VCXO 1k of the second communication device 12 is lower than the clock frequency of the first ATM device 51. Therefore, it is controlled so that the clock frequency of the VCXO 1k becomes higher than the present value (#405).

Note that what degree the clock frequency of the VCXO 1k should be raised or lowered depends on tracking ability of the clock of the VCXO 1k with the clock of the first ATM device 51. For example, in order to increase the tracking ability, the clock frequency of the VCXO 1k should be raised or lowered largely. In this case, however, a variation of the clock of the VCXO 1k also increases. Therefore, in order to decrease the variation for securing stability of the clock, the clock frequency of the VCXO 1k should be raised or lowered by a small degree.

A process for adjusting a phase of the clock of the VCXO 1k of the second communication device 12 with a phase of the clock that is reproduced by the data frame FRD is performed (#407 through #410). Namely, as described before with reference to FIGS. 12(a)-12(d), if the reproduced clock is advanced than the clock of the VCXO 1k by the threshold level Lp or more (Yes in #407 and Yes in #408), it is controlled so that the clock frequency of the VCXO 1k becomes higher than the present value instantaneously (#409). If the reproduced clock is delayed by the threshold level Lp or more (Yes in #407 and No in #408), it is controlled so that the clock frequency of the VCXO 1k becomes lower than the present value instantaneously(#410).

With reference to FIG. 21, the ATM cell 70 is extracted from the data frame FRD that is received from the first communication device 11 and is sent to the second ATM device 52 (#24). In this case, the transmission is performed in accordance with the clock delivered from the VCXO 1k, so the information of the reproduced clock of the first ATM device 51 is transferred to the second ATM device 52.

The process in Step #21 through #24 is repeated while data are sent from the first ATM device 51 to the second ATM device 52 (Yes in #25).

In this way, the clock information of the first ATM device 51 can be given to the second ATM device 52, and it is possible to send data from the first ATM device 51 to the second ATM device 52 via the wide area Ethernet 4 instead of the conventional ATM network 9.

According to this embodiment, communication between the ATM devices 5 can be performed via the wide area Ethernet 4 instead of the ATM network 9. Thus, communication cost can be lower than the conventional method.

Although in this embodiment the function of the communication device 1 is described as separated functions of the data transmission side that is the communication device 1 (the first communication device 11) connected to the ATM device 5 (the first ATM device 51) and the reception side that is the communication device 1 (the second communication device 12) connected to the ATM device 5 (the second ATM device 52), it is possible that one communication device 1 includes both functions of the first communication device 11 and the second communication device 12. Thus, a bidirectional communication can be realized by plural ATM devices 5 via the wide area Ethernet 4.

Although only the last first average time AVF among the first average times AVF calculated in the past is used in the process for calculating the latest first average time AVF shown in FIGS. 7 and 8 for reducing a processor's load of process in this embodiment, it is possible to use other first average times AVF before the last first average time AVF for calculating the latest first average time AVF.

Although the procedure shown in FIGS. 7, 8, 10 and 22 is used as the method for synchronizing the clock of the VCXO 1k of the second communication device 12 with the clock of the first ATM device 51 in this embodiment, it is possible to use other methods. Furthermore, the entire or a part of the structure of the ATM device connection system 3 and the communication device 1, the process contents, the process order and the like can be modified if necessary in accordance with the spirit of the present invention.

Furthermore, this embodiment includes the following invention.

1. A system for supporting communication between ATM devices when data are sent from the first ATM device to the second ATM device by an ATM cell, the system comprising a first connection device and a second connection device that can be connected to each other via Ethernet, the first connection device including an ATM cell reception portion for receiving an ATM cell from the first ATM device via an ATM interface, a first conversion portion for converting the received ATM cell to a data frame supporting a protocol of the Ethernet, a data frame transmission portion for sending the data frame converted by the first conversion portion to the second connection device via the Ethernet, and a control frame transmission portion for sending a control frame that supports the protocol of the Ethernet to the second connection device via the Ethernet at a predetermined time interval in accordance with a transmission side clock frequency that is a clock frequency for communication of the first ATM device, and the second connection device including a control frame reception portion for receiving the control frame from the first connection device, a data frame reception portion for receiving the data frame from the first connection device, a clock reproducing portion for reproducing a clock having the same frequency as the transmission side clock frequency in accordance with the time interval of receiving the control frame, a clock transfer portion for transferring the reproduced clock to the second ATM device via an ATM interface, a second conversion portion for converting the received data frame into the ATM cell, and an ATM cell transmission portion for sending the ATM cell converted by the second conversion portion to the second ATM device via the ATM interface.

2. A data transmission method for sending data from a first ATM device to a second ATM device by an ATM cell, the method comprising the steps of:

connecting a first connection device to a second connection device via Ethernet;

in the first connection device, receiving an ATM cell from the first ATM device via an ATM interface, converting the received ATM cell into a data frame that supports a protocol of the Ethernet, sending the converted data frame to the second connection device via the Ethernet, and sending a control frame that supports the protocol of the Ethernet to the second connection device via the Ethernet at a predetermined time interval in accordance with a transmission side clock frequency that is a clock frequency for communication of the first ATM device; and in the second connection device, receiving the control frame from the first connection device, receiving the data frame from the first connection device, reproducing a clock having the same frequency as the transmission side clock frequency in accordance with the time interval of receiving the control frame, transferring the reproduced clock to the second ATM device via an ATM interface, converting the received data frame into an ATM cell, and sending the converted ATM cell to the second ATM device via an ATM interface.

The present invention can be used preferably in particular in the case where existing ATM devices are newly connected to each other or where a wide area Ethernet network is provided instead of the existing ATM network for reducing cost such as maintaining cost.

While example embodiments of the present invention have been shown and described, it will be understood that the present invention is not limited thereto, and that various changes and modifications may be made by those skilled in the art without departing from the scope of the invention as set forth in the appended claims and their equivalents.

What is claimed is:

1. A data transmission support device for sending data from a first ATM device to a second ATM device by an ATM cell, the data transmission support device comprising:

a data frame reception portion that receives a data frame that is an Ethernet frame including an ATM cell encapsulated therein from another device via Ethernet, the other device being connected to the first ATM device;

a control frame reception portion that receives a control frame via the Ethernet, the control frame being sent by the other device at a predetermined time interval in accordance with a clock frequency of the first ATM device that is a clock frequency for communication of the first ATM device;

a clock reproducing portion that reproduces a clock having the same frequency as the clock frequency of the first ATM device in accordance with the time interval of receiving the control frames;

a clock transfer portion that transfers the reproduced clock to the second ATM device via an ATM interface;

a conversion portion that converts the received data frame into an ATM cell; and an ATM cell transmission portion that sends the ATM cell converted by the conversion portion to the second ATM device via the ATM interface.

2. The data transmission support device according to claim 1, wherein the clock reproducing portion reproduces a clock having the same frequency as the clock frequency of the first ATM device in accordance with plural time intervals of receiving the control frames.

3. The data transmission support device according to claim 2, wherein the control frame has a sequence number assigned in the order of transmission from the other device, and if there is a control frame that is not received by the control frame reception portion, the clock reproducing portion interpolates a reception time of the control frame that is not received in accordance with a reception time of a control frame of the sequence number before the control frame that is not received and a reception time of a control frame of the sequence number after the control frame that is not received so that a clock having the same frequency as the clock frequency of the first ATM device is reproduced.

4. The data transmission support device according to claim 1, wherein the clock reproducing portion reproduces a clock having the same frequency as the clock frequency of the first ATM device in accordance with data that were used in the past when the clock frequency of the first ATM device was reproduced.

5. The data transmission support device according to claim 4, wherein if a reception failure of the control frame is detected, the clock reproducing portion erases data that were used in the past when the clock frequency of the first ATM device was reproduced and restarts reproduction of a clock from the beginning after the control frame is received again.

6. The data transmission support device according to claim 1, further comprising a transmission side clock characteristics measuring portion that measures characteristics of a clock for communication of the first ATM device in accordance with the time interval of receiving the control frames, and a reproduced clock measuring portion that measures the characteristics of the clock reproduced by the clock reproducing portion, wherein the clock reproducing portion reproduces the clock in accordance with a differential between the latest characteristics measured by the transmission side clock characteristics measuring portion and the latest characteristics measured by the reproduced clock measuring portion.

7. The data transmission support device according to claim 1, wherein the clock reproducing portion reproduces the clock so that a phase difference between the clock and a clock to be reproduced by the received control frame falls within a predetermined range.

8. The data transmission support device according to claim 1, further comprising a buffer that stores temporarily an ATM cell before transmission, wherein if quantity of data stored in the buffer becomes predetermined quantity or more, the clock reproducing portion reproduces temporarily a clock having a higher frequency than the clock frequency of the first ATM device.

9. A data transmission support device that sends data from a first ATM device to a second ATM device by an ATM cell, the data transmission support device comprising:
  an ATM cell reception portion that receives an ATM cell from the first ATM device;
  a conversion portion that converts the received ATM cell into a data frame that conforms to a protocol of Ethernet;
  a data frame transmission portion that sends the data frame converted by the conversion portion to another device via the Ethernet, the other device being connected to the second ATM device via an ATM interface; and
  a control frame transmission portion that sends a control frame that conforms to the protocol of the Ethernet to the other device via the Ethernet at a predetermined time interval in accordance with a frequency of a clock for communication of the first ATM device for transferring information about the clock to the second ATM device.

10. The data transmission support device according to claim 9, wherein the control frame transmission portion gives a higher priority for transmission to the control frame than the data frame.

11. The data transmission support device according to claim 9, wherein the control frame transmission portion adjusts the predetermined time interval of sending the control frames in accordance with traffic on the Ethernet.

12. The data transmission support device according to claim 9, wherein the conversion portion generates the data frame having a priority order of transmission assigned in accordance with a CLP value of the ATM cell received by the ATM cell reception portion.

13. The data transmission support device according to claim 9, wherein the data frame transmission portion converts an empty cell into the data frame if there is no ATM cell to be converted into the data frame.

14. The data transmission support device according to claim 13, wherein the data frame transmission portion stops the transmission of the data frame if a transmission time of the data frame into which the empty cell is converted is the same as a transmission time of the control frame by the control frame transmission portion.

15. The data transmission support device according to claim 9, wherein the conversion portion sends the control frame regardless of a state of the other device or a device on a lower network.

16. The data transmission support device according to claim 9, wherein the data transmission support device is connected to a plurality of second ATM devices via the Ethernet, and the data frame transmission portion sends the control frame to each of the second ATM devices.

17. A data transmission method for sending data from a first ATM device to a second ATM device by an ATM cell, the method comprising the steps of:
  receiving a data frame that is an Ethernet frame including an ATM cell encapsulated therein from another device via Ethernet, the other device being connected to the first ATM device;
  receiving a control frame via the Ethernet, the control frame being sent from the other device at a predetermined time interval in accordance with a clock frequency of the first ATM device that is a clock frequency for communication of the first ATM device;
  reproducing a clock having the same frequency as the clock frequency of the first ATM device in accordance with the time interval of receiving the control frames;
  transferring the reproduced clock to the second ATM device via an ATM interface;
  converting the received data frame to an ATM cell; and
  sending the converted ATM cell to the second ATM device via the ATM interface.

18. A data transmission method for sending data from a first ATM device to a second ATM device by an ATM cell, the method comprising the steps of:
  receiving an ATM cell from the first ATM device;
  converting the received ATM cell into a data frame that conforms to a protocol of Ethernet;
  sending the converted data frame to another device via the Ethernet, the other device being connected to the second ATM device via an ATM interface; and
  sending a control frame that conforms to the protocol of the Ethernet to the other device via the Ethernet at a predetermined time interval in accordance with a frequency of a clock for communication of the first ATM device for transferring information about the clock to the second ATM device.

* * * * *